United States Patent
Sevindik et al.

(10) Patent No.: US 11,825,526 B2
(45) Date of Patent: *Nov. 21, 2023

(54) METHODS AND APPARATUS FOR PROVIDING ACCESS TO WIRELESS NETWORKS

(71) Applicant: Charter Communications Operating, LLC, St. Louis, MO (US)

(72) Inventors: Volkan Sevindik, Parker, CO (US); Haider Syed, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/861,172

(22) Filed: Jul. 9, 2022

(65) Prior Publication Data
US 2022/0353925 A1    Nov. 3, 2022

Related U.S. Application Data

(63) Continuation of application No. 16/932,260, filed on Jul. 17, 2020, now Pat. No. 11,438,937.

(51) Int. Cl.
*H04W 74/08* (2009.01)
*H04W 88/08* (2009.01)

(52) U.S. Cl.
CPC ........ *H04W 74/0875* (2013.01); *H04W 88/08* (2013.01)

(58) Field of Classification Search
CPC ................................................ H04W 74/0875
See application file for complete search history.

(56) References Cited

U.S. PATENT DOCUMENTS

| 10,659,978 B1* | 5/2020 | Marupaduga | H04L 5/001 |
|---|---|---|---|
| 2005/0111398 A1* | 5/2005 | Wybenga | H04W 72/0453 370/328 |
| 2007/0230600 A1* | 10/2007 | Bertrand | H04J 13/00 375/260 |
| 2011/0026409 A1* | 2/2011 | Hu | H04L 1/1867 370/243 |
| 2012/0069788 A1* | 3/2012 | Shen | H04W 74/006 370/315 |
| 2016/0309475 A1* | 10/2016 | Wong | H04W 4/70 |
| 2017/0273119 A1* | 9/2017 | Li | H04W 8/08 |
| 2018/0124835 A1* | 5/2018 | Lee | H04W 48/10 |
| 2020/0106582 A1* | 4/2020 | Jalali | H04B 17/318 |
| 2021/0266981 A1* | 8/2021 | Wei | H04W 72/04 |

FOREIGN PATENT DOCUMENTS

WO    WO-2011097827 A1 *  8/2011  .......... H04W 74/002

* cited by examiner

*Primary Examiner* — Jamaal Henson

(74) *Attorney, Agent, or Firm* — Straub & Straub; Stephen T. Straub; Michael P. Straub

(57) ABSTRACT

The present invention relates to methods and apparatus for providing devices access to wireless base stations. An exemplary method embodiment includes the steps of: receiving over the air at a wireless base station a plurality of random access preamble signals from a plurality of devices; and determining, by the wireless base station, the order in which to respond to the received random access preamble signals based on an access priority list. The access priority list being determined based on customer premises equipment devices characteristics, attributes and/or properties.

20 Claims, 21 Drawing Sheets

| WIRELESS BASE STATION RA PREAMBLE ID | TYPE OF USAGE |
|---|---|
| DEDICATED RA PREAMABLE 1 | AVAILABLE FOR CPE ASSIGNMENT |
| DEDICATED RA PREAMBLE 2 | AVAILABLE FOR CPE ASSIGNMENT |
| DEDICATED RA PREAMBLE 3 | AVAILABLE FOR CPE ASSIGNMENT |
| DEDICATED RA PREAMBE 4 | AVAILABLE FOR CPE ASSIGNMENT |
| DEDICATED RA PREAMBLE 5 | AVAILABLE FOR CPE ASSIGNMENT |
| DEDICATED RA PREAMBLE 6 | RESERVED FOR HANDOFF PROCEDURES |
| DEDICATED RA PREAMBLE 7 | RESERVED FOR HANDOFF PROCEDURES |
| NON-DEDICATED RA PREAMBLE 1 | AVAILABLE FOR CPE OR UE |
| ⋮ | AVAILABLE FOR CPE OR UE |
| NON-DEDICATED RA PREAMBLE N | AVAILABLE FOR CPE OR UE |

FIGURE 11

| 1202 | 1204 | 1206 | 1208 | 1210 | 1212 | 1214 | 1216 | 1218 | 1220 | 1222 | 1224 |
|---|---|---|---|---|---|---|---|---|---|---|---|
| CPE DEVICE ID | PRIORITY LEVEL | RA ID | CONNECT TIME | DL TRAF | UL TRAF | NUMBER E-CALLS | LOCATION | NUMBER UEs | NUMBER RA-PREAMBLES | HW TYPE | SW TYPE |
| CPE DEVICE 1 | 3 | 1 | 4 | 7 | 1 | 5 | 1 | 5 | 2 | 1 | 1 |
| CPE DEVICE 2 | 1 | 2 | 3 | 2 | 3 | 3 | 3 | 3 | 1 | 3 | 3 |
| CPE DEVICE 3 | 1 | 3 | 1 | 2 | 3 | 3 | 3 | 3 | 2 | 3 | 3 |
| CPE DEVICE 4 | 3 | 4 | 5 | 6 | 4 | 5 | 1 | 6 | 4 | 1 | 1 |
| CPE DEVICE 5 | 2 | 5 | 5 | 4 | 4 | 5 | 1 | 3 | 2 | 1 | 2 |
| CPE DEVICE 6 | 1 | 2 | 1 | 2 | 3 | 1 | 5 | 2 | 1 | 1 | 3 |

FIGURE 12

| 1102 | 1104' |
|---|---|
| WIRELESS BASE STATION RA PREAMBLE ID | TYPE OF USAGE |
| DEDICATED RA PREAMABLE 1 | AVAILABLE FOR CPE ASSIGNMENT |
| DEDICATED RA PREAMBLE 2 | AVAILABLE FOR CPE ASSIGNMENT |
| DEDICATED RA PREAMBLE 3 | AVAILABLE FOR CPE ASSIGNMENT |
| DEDICATED RA PREAMBE 4 | AVAILABLE FOR CPE ASSIGNMENT |
| DEDICATED RA PREAMBLE 5 | AVAILABLE FOR CPE ASSIGNMENT |
| DEDICATED RA PREAMBLE 6 | AVAILABLE FOR CPE ASSIGNMENT |
| DEDICATED RA PREAMBLE 7 | AVAILABLE FOR CPE ASSIGNMENT |
| NON-DEDICATED RA PREAMBLE 1 | AVAILABLE FOR CPE |
| ⋮ | AVAILABLE FOR CPE |
| NON-DEDICATED RA PREAMBLE N | AVAILABLE FOR CPE |

FIGURE 14

| CPE DEVICE ID | PRIORITY LEVEL | RA ID | CONNECT TIME | DL TRAF | UL TRAF | NUMBER E-CALLS | LOCATION | NUMBER UEs | NUMBER RA-PREAMBLES | HW TYPE | SW TYPE |
|---|---|---|---|---|---|---|---|---|---|---|---|
| CPE DEVICE 1 | 3 | 1 | 4 | 7 | 1 | 5 | 1 | 5 | 2 | 1 | 1 |
| CPE DEVICE 2 | 1 | 2 | 3 | 2 | 3 | 3 | 3 | 3 | 1 | 3 | 3 |
| CPE DEVICE 3 | 1 | 3 | 1 | 2 | 3 | 3 | 3 | 3 | 2 | 3 | 3 |
| CPE DEVICE 4 | 3 | 4 | 5 | 6 | 4 | 5 | 1 | 6 | 4 | 1 | 1 |
| CPE DEVICE 5 | 2 | 5 | 5 | 4 | 4 | 5 | 1 | 3 | 2 | 1 | 2 |
| CPE DEVICE 6 | 1 | 6 | 1 | 2 | 3 | 1 | 5 | 2 | 1 | 1 | 3 |

FIGURE 15

METHODS AND APPARATUS FOR PROVIDING ACCESS TO WIRELESS NETWORKS

RELATED APPLICATIONS

The present application is a continuation of U.S. patent application Ser. No. 16/932,260 which was filed on Jul. 17, 2020 and which is hereby expressly incorporated by reference in its entirety.

FIELD OF INVENTION

The present invention relates to methods and apparatus for providing wireless services to devices for example customer premises equipment devices located at a customer premises. More particularly, the present invention relates to methods and apparatus for accessing and/or managing the access to wireless base stations from customer premises equipment devices and/or user equipment devices. The present invention further relates to methods and apparatus for managing the use of random access preamble signatures by devices being serviced by wireless base stations which provide services to customer premises equipment devices without the need for a landline connection to the customer premises in which the customer premises equipment devices are located.

BACKGROUND OF THE INVENTION

In instances where wireless networks are being used to provide broadband services to a customer premises, the capacity of the wireless connection or link to the customer premises may not be the limiting factor but instead congestion on links, connections or communications paths within the customer premises may become a bottleneck for providing services. For example, such problems occur in Citizens Broadband Radio Service networks.

In a Citizens Broadband Radio Service (CBRS) network, Citizens Broadband Radio Service Devices (CBSDs) serve as access points which can support wireless communications with user equipment devices (UEs).

A CBRS network includes a plurality of CBSD devices. The CBSD devices provide wireless services to subscribers' user equipment devices. Spectrum is granted to each of the CBSDs using a centralized system called the Spectrum Access System (SAS). The Spectrum Access System is a central processing and database system that receives and processes spectrum grant requests. In the CBRS network, interference is managed through power management of CBSD devices by the Spectrum Access System (SAS). The SAS stores information regarding which CBSD uses how much spectrum at which location in the CBRS network.

Many customer premises, e.g., homes do not have landline connections or landline connections which can support broadband services. For example, in various geographical areas, e.g., rural areas of the country with sparse populations, it is not economical or practical to connect landlines to all customer premises. In such areas, there is a need for providing services, e.g., broadband services, to the customer premises which do not have landline connections or do not have landline connections which can provide broadband services. Additionally, in urban areas where landline connections can provide broadband services customers may still desire to have services provided via wireless connections in place of or in addition to landline connections. For example, universities, businesses, hospitals, hotels, etc. may desire to provide broadband or other types of wireless services throughout their customer premises and/or buildings using Wi-FI wireless connections through which users can connect therein being in a position to manage the wireless services provided.

In some CBRS systems the wireless services are provided to a plurality of devices at the customer premises, e.g., user equipment devices, using a customer premise equipment device that provides WI-FI services at the customer premises, the customer premises equipment devices then communicating to a wireless base station, e.g., CBSD. The customer premises equipment devices are located at fixed network locations and attached to or include antennas. The antennas are typically mounted at an elevated fixed location such as on the top of a building or attached to pole on the customer premises so as to avoid obstacles that may inhibit the ability of the customer premises equipment device to be able to communicate with its wireless base station, e.g., CBSD device.

While in normal Long Term Evolution (LTE) wireless network operation, each user terminal which is typically a mobile device obtains access to the network by sending a random access preamble signal to a wireless base station and the wireless base station responds with a random access preamble response. The ETSI TS 136 321 V13.4.0 (2017-02) technical specification described such a random access procedure and how the random access preamble signals are used for uplink synchronization between user terminals and wireless base stations. As the user terminals are typically mobile terminals they are not at fixed positions. If after sending a random access preamble signal, the user terminal does not hear a response from the wireless base station in a pre-determined time interval, the user terminal increases the transmission power level for the random access preamble signal and transmits the higher powered random access preamble signal to the wireless base station. By increasing the power level of the random access preamble signal, the user terminal increases the chances of the wireless base station receiving the random access preamble signal and thereby obtaining access to the wireless network. However, if all user terminals in the network increase their random access preamble power for example concurrently, then none or a limited number of the user terminals will be able to obtain access to the network because of the high interference caused by the higher power random access preamble signals. Furthermore, in known LTE wireless systems other than during wireless handover base station operations, the access to the network by the user terminals does not take into account various factors which might impact the urgency of a user terminal obtaining access to a wireless system. For example, there is no priority given to user terminals attempting to access the network for emergency calls. There is no priority given to user terminals such as CPE devices which are providing services for a plurality of user end point devices even though the CPE device is providing access for a plurality of devices/user it would still be competing for access to the network as if it was serving a single user of a single device.

From the above it should be appreciated that there is a need for new and/or improved methods and apparatus for providing access to a wireless base station and wireless services, e.g., wireless broadband services, to customer premises equipment devices such as those serving a plurality of devices at a customer premises. There is a further need for new and/or improved methods and apparatus for providing access to wireless base stations from customer premises equipment devices without increasing power transmission levels which results in increased signal interference. Additionally, there is a need for new and/or improved methods and apparatus for managing, reducing and/or eliminating interference caused by devices attempting to access wireless services by increasing power transmission levels of random preamble signals transmitted to base stations. In 5G or CBRS wireless systems wherein the frequency spectrum and power level of transmission are controlled by a spectrum management entity such as for example a spectrum access system to minimize interference and maximum frequency spectrum usage/efficiency, there is a need for new and/or improved methods and apparatus to solve the technological problem of how to overcome interference problems when a plurality of customer premises equipment devices from fixed locations attempt to access the wireless network concurrently or within a fixed time period. There is a need for new and/or improved methods and apparatus to solve the technological problem of how to prioritize providing access to a wireless base station when a wireless base station receives a plurality of requests for access concurrently or within a time fixed time period, e.g., when the wireless base station receives more random access preamble signals than it can respond to within a response time period. There is a further need for new and/or improved methods and apparatus for managing the use of random access preamble signals by remote devices and the wireless base stations they are attempting to access. There is a further need for new and/or improved methods and apparatus that take into account a device's properties or attributes when determining whether or when to respond to requests for access and/or a random access preamble signal received from a device by a wireless base station.

SUMMARY OF THE INVENTION

The present invention provides a technological solution of how to manage and use random access preamble signals in a wireless network to provide access to devices, e.g., CPE devices and user equipment devices, at wireless base stations. The present invention provides technological solutions that minimize and/or reduce signal interference by eliminating and/or minimizing the use of incrementing power transmission levels for customer premises equipment devices during access procedures. The present invention further provides a technological solution of how a wireless base station can take into account various attributes, characteristics and/or proprieties of one or more devices seeking access to the wireless base station concurrently, e.g., within a specified time window, when responding to such requests. Various embodiments of the present invention include novel methods and apparatus to solve one or more of the problems identified above.

By using one or more of the techniques described herein a wireless base station can prioritize access to devices, e.g., customer premises equipment devices and user equipment devices, seeking access to services at the wireless base station, e.g., by attempting to attach/connect to the wireless base station. The customer premises equipment devices being devices located at a fixed position at a customer's premises which provides services for one or more user equipment devices, e.g., via a Wi-Fi network at the customer premises at which the customer premises equipment device is located. The present invention also provides new and/or improved random access techniques for customer premises equipment devices in fixed wireless access networks.

An exemplary wireless communications method embodiment in accordance with the present invention includes the steps of: receiving over the air at a wireless base station a plurality of random access preamble signals from a plurality of devices; and determining, by the wireless base station, the order in which to respond to the received random access preamble signals based on an access priority list. The plurality of devices may, and in some embodiments do, include one or more customer premises equipment devices, each of said one or more customer premises equipment devices providing services to one or more user equipment devices.

In some embodiments, the wireless communications method further includes the step of: generating from information obtained over a first time period, by the wireless base station, a customer premises equipment device profile for each of the one or more customer premises equipment devices connected to the wireless base station, each of said customer premises equipment device profiles including a customer premises equipment device identifier which identifies the customer premises equipment device to which the customer premises equipment device profile corresponds and one or more attributes or properties of the customer premises equipment device. In some embodiments, the one or more attributes and/or properties of the customer premises equipment device includes one or more of the following: (i) location of the customer premises equipment device; (ii) customer premises equipment software type (e.g., software version and/or release number such as LTE or 5G release number—higher the release number higher the priority); (iii) customer premises equipment hardware type (e.g., hardware equipment type identification information/identification number, hardware version and/or release number, number of CPUs, number of memory units); (iv) an amount of time during the first time period during which the customer premise equipment device is connected to the wireless base station; (v) an amount of downlink traffic communicated from the wireless base station to the customer premises equipment device; (vi) an amount of uplink traffic communicated from the customer premises equipment device to the wireless base station; (vii) a number of times the wireless base station receives a random access preamble signal from the customer premises equipment device; and (viii) a number of emergency calls received from the customer premises equipment device.

In some embodiments of the wireless communications method further includes the step of generating the access priority list based on information included in customer premises equipment profiles.

In a variety of embodiments, the wireless base station includes a set of dedicated random access preamble signatures and a set of non-dedicated random access preamble signatures. The set of dedicated random access preamble signatures may be, for example, a set of 64 different preamble signatures which are used for contention free random access procedures. The contention free random access procedures may, and in some embodiments do, include: customer premises devices reconnections and mobile user equipment device handovers between wireless base stations.

In some embodiments, the wireless communications method further includes that prior to receiving the plurality of random access preamble signals at the wireless base station, the wireless base station performs the steps of: determining, by the wireless base station, the number of customer premises equipment devices connected to the wireless base station; determining a priority level for each customer premises equipment device; and assigning one of the dedicated random access preamble signatures from the set of dedicated random access preamble signatures to each of the customer premises equipment devices connected to the wireless base station. In some such embodiments, the wireless communications method further includes that when the number of customer premise equipment devices is equal to or less than the number of dedicated random access preamble signatures available for assignment by the wireless base station, the step of assigning one of the dedicated random access preambles from the set of dedicated random access preamble signatures to each of the customer premises equipment devices connected to the wireless base station includes assigning a different dedicated random access preamble to each of the customer premises equipment devices. In some embodiments, when the number of customer premise equipment devices is greater than the number of dedicated random access preamble signatures available for assignment by the wireless base station, the step of assigning one of the dedicated random access preamble signatures from the set of dedicated random access preamble signatures to each of the customer premises equipment devices connected to the wireless base station includes: assigning dedicated random access preamble signatures to each of the customer premises equipment devices based on customer premises equipment device profile information for the customer premises equipment devices.

In some embodiments, the wireless communications method further includes that when assigning the same dedicated random access preamble signature to more than one customer premises equipment device basing said assignment on (i) the priority level of the customer premises equipment devices, and/or (ii) the number of times the wireless base station receives a random access preamble signal from each of the customer premises equipment devices during a time period.

In some embodiments, the wireless communications method further includes that when assigning the same dedicated random access preamble signature to more than one customer premises equipment device basing said assignment on (i) the priority level of the customer equipment devices and/or (ii) the location of the customer premises equipment devices to one another.

In most embodiments, the dedicated random access preamble signals have a higher priority on the access priority list than said non-dedicated random access preamble signals so that when the received random access preamble signals contain both dedicated and non-dedicated random access preamble signals, the received dedicated random access preamble signals are responded to before the received non-dedicated random access preamble signals.

In some embodiments, the wireless base station communicates to each customer premise equipment device an instruction not to increment the transmission power level used for transmitting the dedicated random access preamble signal after a failure to receive a response to a transmission of the dedicated random access preamble signal.

In some method embodiments of the present invention, one or more customer premises equipment devices receive from a wireless base station a dedicated random access preamble signature that has been assigned to the customer premises equipment device for use when attempting to access to the wireless base station, each customer premises equipment device transmitting its assigned dedicated random access preamble signature signal to the wireless base station when attempting to reconnect to the wireless base station after a connection between the customer premises equipment device and the wireless base station has been terminated, e.g., during a power outage.

The present invention is also applicable to and includes apparatus and systems such as for example, apparatus and systems that implement one or more of the steps of the method embodiments. An exemplary communications system in accordance with the present invention includes a wireless base station including: memory; and a processor included in the wireless base station which controls the operation of the wireless base station to perform the following operations: (i) receive over the air at a wireless base station a plurality of random access preamble signals from a plurality of devices; and (ii) determine the order in which to respond to the received random access preamble signals based on an access priority list.

In some embodiments, the plurality of devices includes one or more customer premises equipment devices, each of said one or more customer premises equipment devices providing services to one or more user equipment devices.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 11 illustrates an exemplary table identifying a set of random access preamble signatures available for use at a wireless base station with corresponding information regarding type of usage.

FIG. 12 illustrates an exemplary table including an exemplary set of CPE priority profile records.

FIG. 14 illustrates an exemplary table identifying a set of random access preamble signatures available for use at a wireless base station with corresponding information regarding type of usage.

FIG. 15 illustrates an exemplary table including an exemplary set of CPE priority profile records.

DETAILED DESCRIPTION

Figure 1:
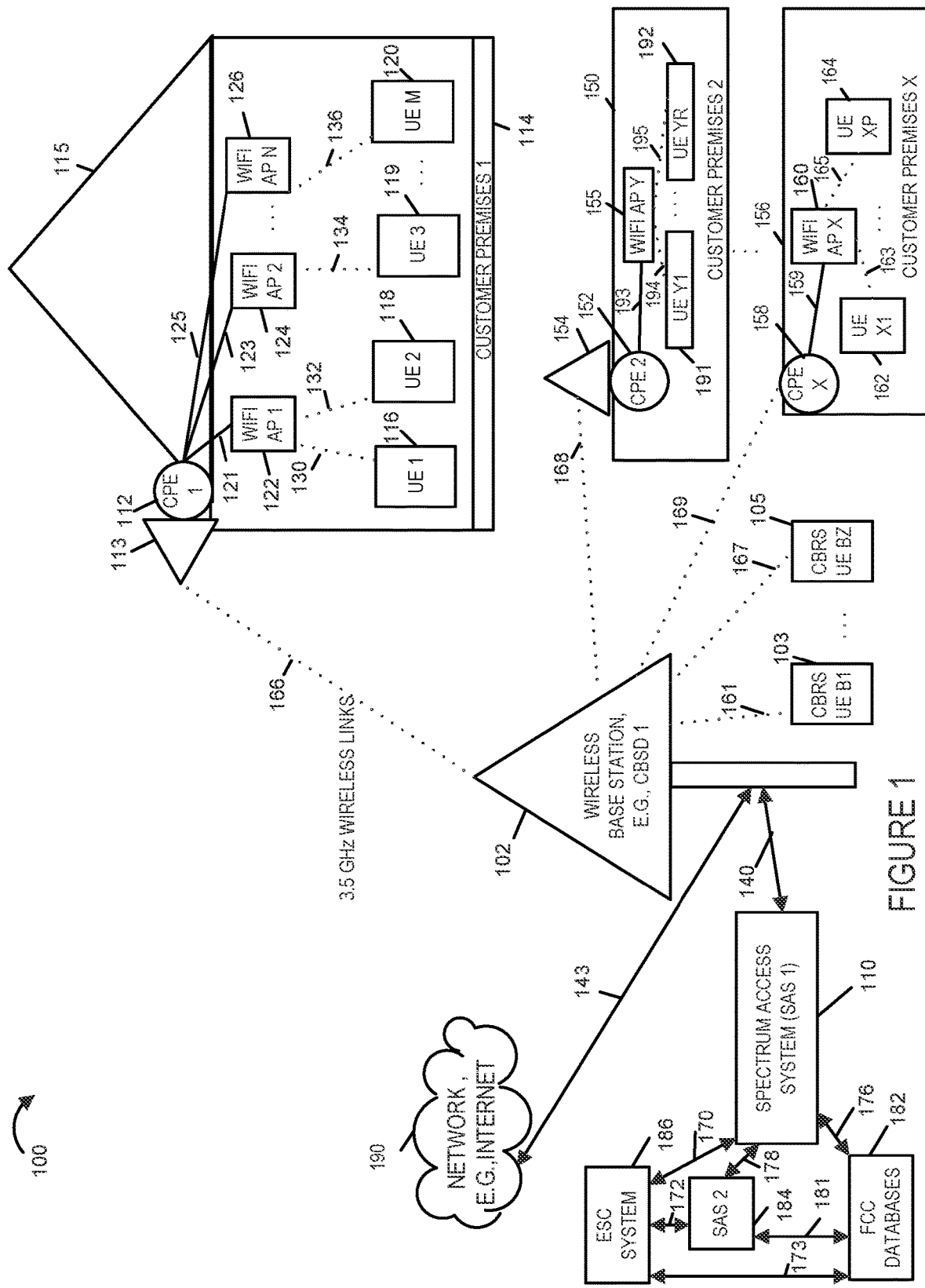
FIG. 1 illustrates an exemplary wireless communications system shown as a Citizens Broadband Radio Service network system 100 that provides wireless communications services in accordance with one embodiment of the present invention.

The current invention is applicable to wireless networks, e.g., Citizens Broadband Radio Service (CBRS) networks, that provide wireless communications services, e.g., broadband services to user equipment devices at customer premises. The present invention is particularly useful in fixed wireless access networks in which the network environment is a relatively controlled environment since the customer premises equipment devices are fixed at certain locations, i.e., at customer premises, in the network. The present invention provides new and/or improved methods and apparatus for accessing wireless base stations from devices, e.g., customer premises equipment devices and user equipment devices, while minimizing and/or reducing interference and prioritizing access based on a device's characteristics and/or attributes. Various embodiments of the present invention are directed to new apparatus and methods for providing access to wireless services, e.g., broadband data services, to devices located at a customer premises. While the invention is explained using an exemplary Citizens Broadband Radio Service network, it should be understood that the invention is not limited to Citizens Broadband Radio Service networks.

As previously explained in normal Long Term Evolution (LTE) wireless network operation, each user terminal which is typically a mobile device obtains access to the network by sending a random access preamble signal to a wireless base station and the wireless base station responds with a random access preamble response. As the user terminals are typically mobile terminals they are not at fixed positions. If after sending a random access preamble signal, the user terminal does not hear a response from the wireless base station in a pre-determined time interval, the user terminal increases the transmission power level for the random access preamble signal and transmits the higher powered random access preamble signal to the wireless base station. By increasing the power level of the random access preamble signal, in the normal LTE system wherein the user terminals are not at fixed locations but are mobile, the increase in power increases the chances of the wireless base station receiving the random access preamble signal and thereby obtaining access to the wireless network. However, when the wireless system includes CPE devices that are at a fixed position increasing the CPE devices power when there are concurrent conflicting access requests just increases the interference between the CPE devices trying to obtain access and hence none or only a limited number of the CPE devices will be able to obtain access to the network because of the high interference caused by the higher power random access preamble signals. These higher power random access preamble messages also result in interference with other wireless signals being exchanged in the network negatively affecting the efficiency of the spectrum's usage and can result in the SAS device reducing the power levels for the wireless base station therein limiting the coverage area of the wireless base station and signal strength and quality of the wireless transmission by the wireless base station.

Furthermore, in known LTE wireless systems other than during wireless handover base station operations, the access to the network by the user terminals does not take into account various factors which might impact the urgency of a user terminal obtaining access to a wireless system. Even though customer premises equipment devices are not mobile and therefore do not need to have contention free access for handovers, there are other factors that impact the urgency of access to the network by customer premises equipment (CPE) devices. For instance, one CPE device might receive an emergency call over Wi-Fi from an end point device or user equipment device that it is providing services to, then this CPE device has to wake up and connect to the wireless base station, e.g., CBSD, immediately. Or if one CPE device carries a greater amount of traffic than other CPE devices in the network, this CPE device should be provided access to the network faster than a CPE device carrying a lesser amount of traffic. The present invention takes various characteristics, attributes and/or properties of the CPE devices in the network into account and the wireless base station creates or generates CPE device profiles for at least some if not all CPE devices which connect or attach to the wireless base station. When more than one CPE device receives services from a single wireless base station, then that wireless base station creates a random access priority list for the CPE devices based on information contained in the CPE device profiles. Once created the random access priority list is used by the wireless base station to determine the order in which the CPE devices are granted access to connecting to the wireless base station when multiple random access requests are received concurrently or within a predetermined time period from different CPE devices. More particularly, the wireless base station allocates or assigns dedicated random access preamble signatures to CPE devices and when multiple dedicated random access preamble signatures are received concurrently or within a predetermined time period, the wireless base station responds to the received dedicated random access preamble signatures/signals in the priority order included on the priority access list. In this way, the dedicated random access preamble signatures assigned to the CPE devices are responded to based on the CPE device's priority level with the higher priority level CPE devices being responded to before CPE devices with a lower priority level.

In one exemplary method embodiment of the present invention, the method includes the steps of: (i) wireless base stations, e.g., CBSDs, register with a Spectrum Access System (SAS) managing the spectrum allocation and power level usage of devices in the wireless network (e.g., CBRS network), (ii) customer premises equipment (CPE) devices register with the SAS, (iii) a plurality of CPE devices connect to the same wireless base station (e.g., CBSD); (iv) the wireless base station counts the number of CPE devices connected to itself (e.g., by counting the number of devices with different CPE device identifiers connected to the wireless base station); (v) the wireless base station creates a CPE device profile for each CPE device connected to the wireless base station; (vi) the wireless base station creates a priority access list which prioritizes the order with which CPE devices will be given access to the network when requests for access are received concurrently or within a predetermined time period; (vii) the wireless base station assigns dedicated random access preamble signatures to the CPE devices; (viii) when two CPE devices have the same priority level and same assigned dedicated random access preamble signature, then the wireless access base station instructs the CPE devices to use different power levels for random access preamble signals transmitted to the wireless base station to obtain access to the network; (ix) if CPE devices have there connections with the wireless base station severed or terminated and the CPE devices try to re-connect to the wireless base station concurrently or within a predetermined time period by transmitting random access preamble signals to the wireless base station, the wireless base station will use the access priority list to determine the order in which it responds to the received random access preamble signals from the CPE devices. Examples of connections being severed or terminated that can result in CPE devices concurrently attempting to access the wireless base station include signal interference, power outage, wireless base station problem(s) or issue(s), software upgrades at the wireless base station, CPE device issue(s) or problem(s), software upgrades broadcast or transmitted to a plurality of CPE devices. This embodiment may be, and in some embodiments is, implemented using system 100 shown in FIG. 1 and described in detail below. Various additional embodiments of the present invention will be explained in further detail below.

Citizens Broadband Radio Service networks are networks that include user equipment devices, e.g., mobile or wireless devices such as for example cell phones, smart phones, laptops, tablets, smart TVs, Citizens Broadband Radio Service Devices (CBSDs) which serve as access points/base stations, and Spectrum Access Systems which provides spectrum assignments and manage frequency interference through power management of the CBSDs transmission power. The Citizens Broadband Radio Service network utilizes the 150 megahertz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

Various embodiments of the present invention describe methods, apparatus, systems and techniques for providing wireless services, e.g., broadband services, to one or more devices at a customer premises. In some embodiments of the present invention, Citizen Broadband Radio Service spectrum, 3.5 GHz frequency spectrum band, is used to serve nomadic and stationary users. In some embodiments, a CBSD base station is dedicated to serving only stationary users, while in other embodiments the CBSD serves both nomadic and stationary users. The invention is useful to provide broadband services to geographically isolated or remote areas, e.g., rural areas, where wired or optical connections are expensive and not economical given the number of customers to be serviced. The invention is also useful in urban areas where wireless services may be preferred as a replacement for wired connections or in addition to wired connections. In the present invention, a CBRS Customer Premise Equipment device (CPE) is located at a customer's premises inside of a house, business or any place where there are CBRS network users. The CBRS CPE device is coupled or connected to at least one CBRS fixed wireless access (FWA) tower base station (e.g., CBSD) over wireless communications links. The CBRS CPE is typically located in a building such as a home and is coupled to one or more antennas or an antenna array through which the CBRS CPE device transmits to and receives from the antenna(s) of the CBRS FWA tower base station (CBSD) wireless signals over the wireless communications link. These wireless communications links being in the 3.5 GHz frequency spectrum band. The CBRS CPE device in some embodiments includes external antennas. In some embodiments, the CBRS CPE device includes one or more internal antennas. In some embodiments, the CBRS CPE device includes one or more internal antennas and one or more antenna ports to which one or more external antennas are connected. The CBRS CPE device is coupled through a wired connection, e.g., a cable to one or more Wireless Fidelity (Wi-Fi) Access Points. The CBRS CPE device also referred to herein as CPE device or CPE serves the subscribers or users located in its coverage area, e.g., in the house, building, or on the customer's premises. The one or more Wi-Fi access points provide Wi-Fi services to the one or more end point devices or user equipment devices located at the customer premises. The one or more Wi-Fi access points are connected over a cable or wired communications to the CBRS CPE device through which backhaul is provided.

The wireless base station in the exemplary embodiment is a CBRS FWA tower base station which is a CBSD device and as such its transmission power levels and spectrum bandwidth are allocated or assigned to it via a Spectrum Access System of the CBRS network. The CBRS network includes multiple CBSD devices though only a single wireless base station, CBSD, is shown in the exemplary system 100 illustrated in FIG. 1.

Each wireless base station, e.g., CBRS FWA tower base station/CBSD, is coupled to and registered with a CBRS network Spectrum Access System (SAS) of the CBRS network. The CBRS network Spectrum Access System manages the allocation of CBRS network spectrum and transmission power levels. The SAS is responsible for assigning/allocating spectrum to the CBRS FWA tower base stations.

The CBRS CPE device antenna(s) are typically located at an elevated position such as for example on the top of a roof of a building or on a pole outside the building in which the CBRS CPE device is located. In some embodiments, the CBRS CPE device includes one or more internal antennas and/or one or more antenna ports for connecting the device via a wire to external antennas mounted outside of the building.

The transmission power levels allocated for the wireless base stations, e.g., CBRS FWA tower base stations/CBSDs, are high in comparison to the transmission power level of the CPE devices, e.g., CBRS CPE devices. For example, a CBRS FWA tower base station coverage area can include hundreds of customer premises while the CBRS CPE device has a much smaller coverage area. Each CBRS CPE located at a customer's premises provides services to subscriber's user equipment devices such as computers, laptops, tablets, smart devices (e.g., appliances, watches, smartTVs), streaming devices, WiFi devices, CBRS enabled devices (e.g., CBRS phones), via one or more Wi-Fi Access Points. The CPE device includes at least one wireless interface for communicating with wireless base station, e.g., CBRS FWA tower base station. The CPE device also includes one or more wired and/or optical interfaces so that it can be coupled to and communicate with WiFi access points or base stations and/or other devices with wired and/or optical interfaces such as internet telephony systems, cable network devices, internet media streaming devices, e.g., over wired or optical networks (e.g., local area networks or wide area networks) at the customer's premises. The CPE device provides bridging and/or protocol converter and/or router functionality as the CPE device converts wireless signals received in a first protocol format, e.g., 5G wireless signal, CBRS wireless signal or a cellular wireless signal, to a format that is understood by the Wi-Fi access points.

FIG. 1 illustrates an exemplary wireless communications system 100 illustrated as a CBRS network communications system, having an architecture implemented in accordance with an embodiment of the present invention and being coupled to a network 190 (e.g., the internet). The communications system 100 also referred to as the CBRS communications network system 100 includes at least one wireless base station 1 102 illustrated as a Citizens Broadband Radio Service Fixed Wireless Assess (FWA) tower base station (CBSD) (e.g., CBSD 1), a plurality of Spectrum Access System devices (SAS 1 110, SAS 2 184), a plurality of customer premises (customer premises 1 114, customer premises 2 150, . . . , customer premises X 156, X being an integer greater than 2), a plurality of CBRS Customer Premises Equipment devices (CBRS CPE device 1 112, CBRS CPE device 2 152, . . . , CBRS CPE device X 158, X being integer greater than 2), a plurality of Wi-Fi Access Points or base stations (Wi-Fi AP 1 122, Wi-Fi AP 2 124, . . . , Wi-Fi AP N 126, Wi-Fi AP Y 155, Wi-Fi AP X 160) an ESC system 186, a FCC Database System 182, and a plurality of communications links 121, 123, . . . , 125, 130, 132, 134, . . . , 136, 140, 143, 159, 163, 165, 166, 168, 169, 170, 172, 173, 176, 178, and 181. The CBRS system 100 is coupled to a network 190, e.g., the Internet, through which various services can be provided such as for example voice over internet call services, video on demand services, video conferencing services. In some embodiments, the network is a part of the CBRS network and the services are provided from CBRS network service providers. In the example system shown in FIG. 1 the wireless base station 102, e.g., CBRS FWA tower base station 1 or CBSD 1 is illustrated as being coupled or connected to the network 190 via communications link 143 which may be a wired, wireless or optical link. Though not shown the CBRS network typically includes other wireless base stations, e.g., CBRS tower base stations or CBSDs, which are also typically coupled or connected to the network 190 via communications links. In some embodiments, the wireless base stations, e.g., CBRS tower base stations or CBSDs, are coupled to a packet gateway system which is part of and located in the network 190.

CPE device 1 (CPE 1) 112, e.g., CBRS CPE device, includes an antenna system 113, e.g., one or more antenna or an antenna array mounted on a roof of a building 115, e.g., home or office building, located in customer premises 1 114 for communicating with the wireless base station 102, e.g., CBRS tower base station 1 102. The antenna being coupled to a portion of the CPE device 1 which is located inside the house 115 and which also includes separate interfaces for communicating with Wi-Fi Access Points located at the customer premises or within its coverage range. Wi-Fi Access Points 122, 124, and 126 are coupled to or connected to the CPE device 1 112 via wires or cables 121, 123, and 125 respectively in the exemplary embodiment.

CPE device 2 (CPE 2) 152, e.g., CBRS CPE device 2, is located at the customer premises 2 150 and includes an antenna system 154 located at an elevated position (e.g., mounted on a pole or roof of a building located at the customer premises 2 150) for communicating with the wireless base stations e.g., wireless base station 102, e.g., CBRS tower base station 1 102. The elevation of the antenna system allows for less obstruction of wireless signals do to other structures and hence provides for a larger geographical area within which it can exchange wireless signals with wireless base stations, e.g., CBRS tower base stations. CPE 2 152 also includes a separate interface for communicating with a Wi-Fi Access Point located at the customer premises or within its coverage range. Wi-Fi Access Point Y 155 is coupled to or connected to the CPE device 2 152 via a wire or cable 193 in the exemplary embodiment. While only a single Wi-Fi AP Y 155 is shown as receiving services from the CPE device 2 152 at customer premises 2 150, in various embodiments more than one Wi-Fi Access Point may be implemented and coupled and/or connected to CPE device 2 152 and receive services via the CPE device 2 152.

CPE device X (CBRS CPE X) 158 is located at the customer premises X 156 and includes an internal antenna and/or antenna array within the device for communicating with wireless base stations, e.g., CBRS tower base station 1 102 also referred to as CBSD 1.

Customer premises 1 114 includes Wi-Fi Access Point 1 (Wi-Fi AP 1) 122, Wi-Fi AP 2 124, ..., Wi-Fi AP N (N being an integer greater than 2) which provide Wi-Fi services to the user equipment devices at the customer premises 1 114 which include UE 1 116, UE 2 118, UE 3 119, ..., UE M 120, where M is an integer greater than 3.

Customer premises 2 150 similarly includes one or more Wi-Fi access points and UE devices though only a single Wi-Fi Access Point Y 155 and user equipment devices UE Y1 191, ..., UE YR 192 are shown for the sake of simplicity. UE Y1 191, ..., UE YR 192 being coupled to the Wi-Fi Access Point Y 155 via wireless communications links 194, ..., 195.

Customer premises X 156 includes CPE device X 158, Wi-Fi Access Point X 160 and endpoint or user equipment devices UE X1 162, ..., UE XP 164, where P is an integer greater than 1. The user equipment devices UE X1 162, ..., UE XP 164 being coupled or connected to the Wi-Fi AP X 160 via Wi-Fi communications links 163 and 165. The Wi-Fi AP X 160 being coupled or connected to the CPE X via a communications link 159 such as for example a wire or cable connection.

In the exemplary embodiment, the user equipment devices UE 1 116, UE 2 118, UE 3 119, ..., UE M 120, UE Y1 191, ..., UE YR 192, and UE X1 162, ..., UE XP 164 are enabled to wirelessly communicate using a wireless protocol which in this example is a Wi-Fi protocol which is different than the wireless protocol used to communicate between the CPE devices and the wireless base stations which use a 5G protocol such as the CBRS wireless protocol.

In some embodiments, the Wi-Fi Access Points are Wi-Fi routers and the UE devices at the customer premises may be, and in some embodiments are, coupled or connected to the Wi-Fi Access Points or routers via cables or wires.

In some embodiments, the wireless base station 102, e.g., CBSD 1 102 also supports optional CBRS mobile user equipment devices CBRS UE B1 103, ..., CBRS UE BZ 105 which communicate with the CBSD 1 102 using a 5G or CBRS wireless protocol via 3.5 GHz wireless links 161 and 167 respectively.

The SAS 1 110 is coupled to SAS 2 184 via communications link 178. SAS 1 110 is coupled to FCC Databases 182 via communications link 176. SAS 2 184 is coupled to FCC Databases 182 via communications link 181. ESC system 186 is coupled to SAS 1 110 and SAS 2 184 via communications links 170 and 172 respectively. The ESC System 186 is coupled to the FCC Databases 182 via communications link 173. The ESC system 186 is used to detect and/or sense Navy radar operations in CBRS operation within 3550-3650 MHz near the coasts and provide notifications over the communications links to SAS 1 110 and SAS 2 184. SAS 1 110 manages the CBRS tower base station 1 102 spectrum allocation and transmission power to limit interference in the CBRS network. SAS 2 184 manages CBSDs including other CBRS tower base stations in the CBRS network which are not shown in FIG. 1. SAS 1 110 and SAS 2 184 communicate and share information regarding the CBRS network coverage of the CBSDs including CBRS tower base stations each respectively manage and coordinate management of the allocation of spectrum and power transmission levels of CBSDs including CBRS tower base stations throughout the CBRS network. While only two SAS devices are shown in FIG. 1, it should be understood that additional SAS devices are typically used in the CBRS network. In some embodiments, one or more of the CBRS tower base stations of the CBRS network are also coupled or connected to each other either through wired and/or wireless communications links so that they can communicate and exchange information.

In the exemplary embodiment, the communications links 161, 166, 167, 168, 169 are wireless communications links in the 3.5 GHz frequency spectrum band. The communications link 166 couples or connects the wireless base station 102, e.g., CBRS tower 1 base station 102, to CPE device 1 112. The communications link 168 is also a wireless communications link in the 3.5 GHz frequency spectrum band that couples or connects wireless base station 102 to CPE device 2 152. The communications link 169 is a wireless communications link in the 3.5 GHz frequency spectrum band that couples or connects wireless base station 102 to CPE device X 158. Communications links 161 and 167 are wireless communications links in the 3.5 GHz frequency spectrum band that couples or connects wireless base station 102 to CBRS user equipment devices UE B1 103, ..., UE BZ 105 respectively.

The CPE devices are fixed or non-mobile devices located at customer premises. In some embodiments the wireless base station 102 only provides wireless services to users via CPE devices and does not support CBRS mobile wireless user equipment devices such as the optional CBRS UE B1 103, ..., CBRS UE BZ 105 devices.

Communications links 140, 143, 170, 172, 173, 176, 178, 181 are typically wired communications links or fiber optical cables. Communications links 140 couples or connect SAS 1 110 to wireless base station, e.g., CBSD 1 102.

The communications links 130, 132, 134, ..., 136 are Wi-Fi wireless communications links which couple or connect user equipment device 1 (UE 1) 116, user equipment device 2 (UE 2) 118, user equipment device 3 (UE 3) 119, ..., user equipment device M 120 to Wi-Fi Access Points as shown in FIG. 1.

The communications links 194 and 195 are Wi-Fi wireless communications links which couple or connect user equipment device UE Y1 191 and user equipment device UE YR 192 to Wi-Fi Access Point Y 155 as shown in FIG. 1.

The communications links 163 and 165 are Wi-Fi wireless communications links which couple or connect user equipment device UE X1 162 and user equipment device UE XP 164 to Wi-Fi Access Point X 160 as shown in FIG. 1.

In the exemplary system 100, one or more of the customer premises do not have wired or optical communications links that provide broadband services to the user devices located at the customer premises instead broadband services are provided by the wireless network, e.g., CBRS network by the wireless communications links coupling the wireless base station 102, e.g., CBRS tower base station 1 102, to the user devices located at the customer premises via the indirect wireless connections via the CPE device and Wi-Fi Access Points located at the customer premises. Exemplary customer premises include campuses (e.g., college campuses), buildings such as for example homes, hospitals, libraries, office buildings, warehouses, parks, etc. and as such have varying diverse demands for the number of user equipment devices and loading that the wireless base station needs to support. In some embodiments, the wireless base station is located in a rural area where cable links are not economical and the wireless base station provides the broadband services to the users located at the customer premises within its cell coverage via the CPE devices. The CPE devices communicate with the wireless base stations through interfaces that operate as CBRS user equipment devices and not as CBSD base stations.

In some embodiments, the CPE devices located at the customer premises include Wi-Fi routers or router circuitry and directly communicate with the Wi-Fi devices within their coverage area without requiring separate Wi-Fi Access Points.

It is to be understood that the communication links shown in system 100 are only exemplary and other network configurations and communications links may be employed that couple together the devices, base stations, access points, nodes, entities, and databases of the system 100. Elements or steps with the same reference numbers used in different figures are the same or similar and those elements or steps will not be described in detail again.

While for the sake of simplicity in explaining the invention system 100 only illustrates a single wireless base station shown as CBRS tower base station device (CBSD), two SAS devices and a few customer premises with a single CPE device located therein servicing a few UE devices through one or more Wi-Fi Access Points, it will be appreciated that system 100 typically includes a large plurality of wireless base stations, e.g., CBRS tower base stations or CBSDs, with a large number, e.g., hundreds, of customer premises within each of the wireless base station's, e.g., CBRS tower base station's, coverage range including a CPE device which is supporting a plurality of Wi-Fi Access Points and a plurality of UE devices at the customer premises with the wireless base stations being managed by a plurality of SAS devices which are in communication with one another.

Figure 3:
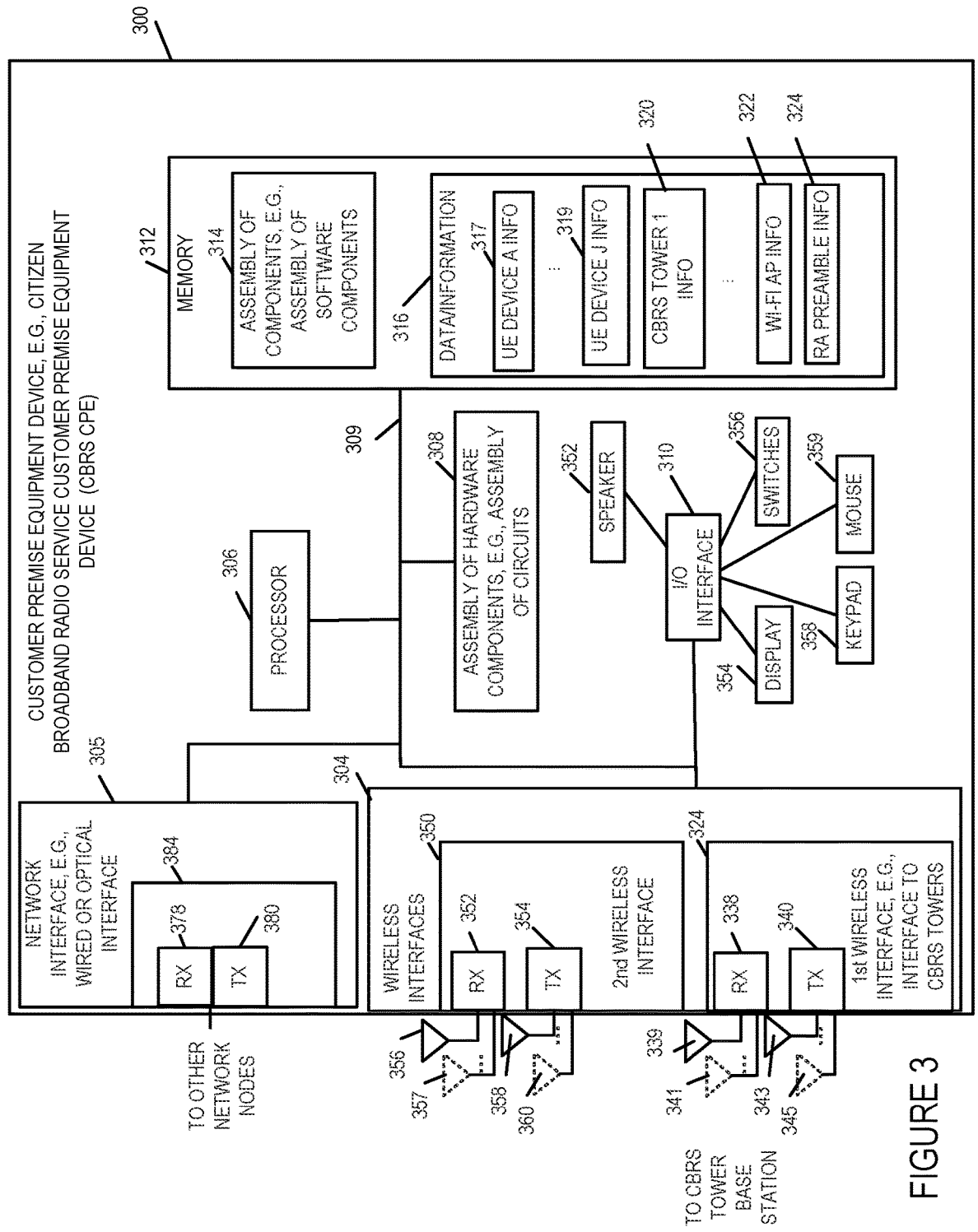
FIG. 3 illustrates details of an exemplary Customer Premises Equipment device, e.g., a Citizens Broadband Radio Service Customer Premise Equipment (CBRS CPE) device, in accordance with one embodiment of the present invention.

FIG. 3 is a drawing of an exemplary CPE device 300, e.g., a Citizens Broadband Radio Service Customer Premise Equipment device 300, in accordance with an exemplary embodiment. Exemplary CPE device 300 includes wireless interfaces 304, a network interface 305, e.g., a wired or optical interface, a processor 306, e.g., a CPU, an assembly of hardware components 308, e.g., an assembly of circuits, and I/O interface 310 and memory 312 coupled together via a bus 309 over which the various elements may interchange data and information. CPE device 300 further includes a speaker 352, a display 354, switches 356, keypad 358 and mouse 359 coupled to I/O interface 310, via which the various I/O devices (352, 354, 356, 358, 359) may communicate with other elements (304, 305, 306, 308, 312) of the CPE device 300. Network interface 305 includes a receiver 378 and a transmitter 380. In some embodiments, receiver 378 and transmitter 380 are part of a transceiver 384. Wireless interfaces 304 include a plurality of wireless interfaces including first wireless interface 324 and a second wireless interface 350. The first wireless interface 324 is used to communicate with the wireless base station, e.g., CBRS tower base station. The second wireless interface is optional and can be used to communicate with a different wireless base station than the first wireless interface for example to obtain additional backhaul capability. The first wireless interface 324 includes wireless receiver 338 and a wireless transmitter 340. In some embodiments, receiver 338 and transmitter 340 are part of a transceiver. In various embodiments, the first wireless interface 324 includes a plurality of wireless receivers and a plurality of wireless transmitters. Wireless receiver 338 is coupled to a plurality of receive antennas (receive antenna 1 339, . . . , receive antenna M 341), via which CPE device 300 can receive wireless signals from other wireless communications devices including a second wireless communications device, e.g., a wireless base station, e.g., CBRS tower base station or CBSD. Wireless transmitter 340 is coupled to a plurality of wireless transmit antennas (transmit antenna 1 343, . . . , transmit antenna N 345) via which the CPE device 300 can transmit signals to other wireless communications devices including a second wireless communications device, e.g., wireless base station such as a CBRS tower base station. The antennas 339, . . . , 341 and 343, . . . , 345 are typically mounted on the roof of the building in which the CPE device is located or on a poll at an elevated height with the other elements of the CPE device being connected to the antennas via a wired or fiber optic connection. In some embodiments the various antennas form an antenna array with the antennas pointing in different directions. In some embodiments, one or more of the antennas are included inside the housing of the CPE device and the CPE device includes one or more connections to which exterior antennas may be connected.

The second optional wireless interface 350 includes wireless receiver 352 and a wireless transmitter 354. In some embodiments, receiver 352 and transmitter 354 are part of a transceiver. In various embodiments, the second wireless interface 350 includes a plurality of wireless receivers and a plurality of wireless transmitters. Wireless receiver 352 is coupled to one or more receive antennas (receive antenna 1 356, . . . , receive antenna M 357), via which CPE device 300 can receive wireless signals from other wireless communications devices including a second wireless communications device, e.g., a second wireless base station using the same or a different wireless protocol than the first wireless interface. Wireless transmitter 354 is coupled to one or more wireless transmit antennas (transmit antenna 1 358, . . . , transmit antenna N 360) via which the CPE device 300 can transmit signals to other wireless communications devices including a second wireless communications device. In some embodiments, the second wireless interfaces 350 are Wi-Fi interfaces so that the CPE device can communication over Wi-Fi wireless links to user equipment devices. In some such embodiments, the CPE device includes one or more hardware and/or software components that provide wireless routing services for the Wi-Fi interfaces and the CPE device also acts as a Wi-Fi router.

The CPE device network interface 305 may be coupled to Wi-Fi Access Points, LAN networks, WANs, routers, e.g., WiFi routers or Access Points, so that various devices in the home without wireless interfaces can also be serviced via wired or optical links by the CPE device 300.

Memory 312 includes an assembly of components 314, e.g., an assembly of software components, and data/information 316. Data/information 316 includes UE device information corresponding to a plurality of user equipment devices (UE device A information 317, . . . , UE device J information 319 where A to M are the UE devices being serviced by the CPE device) and wireless device base station information (e.g., CBRS tower base station 1 information 320) and Wi-Fi Access Point Information 322 which includes information about the Wi-Fi Access Points connected to the CPE device, Random Access (RA) Preamble information 324 including information on generating the RA Preamble signal (e.g., dedicated RA preamble) assigned to the CPE device for use by CPE device to obtain uplink synchronization and access the wireless base station e.g., CBRS Tower 1 (CBSD 1) to obtain services via the wireless network, e.g., initiate or received calls, download videos, etc. In some embodiments, one or more of the CPE devices shown and/or discussed in connection with the Figures and methods discussed herein including one or more of CPE device 1 112, CPE device 2 152, . . . , CPE device X 158 are implemented in accordance with CPE device 300.

Figure 4:
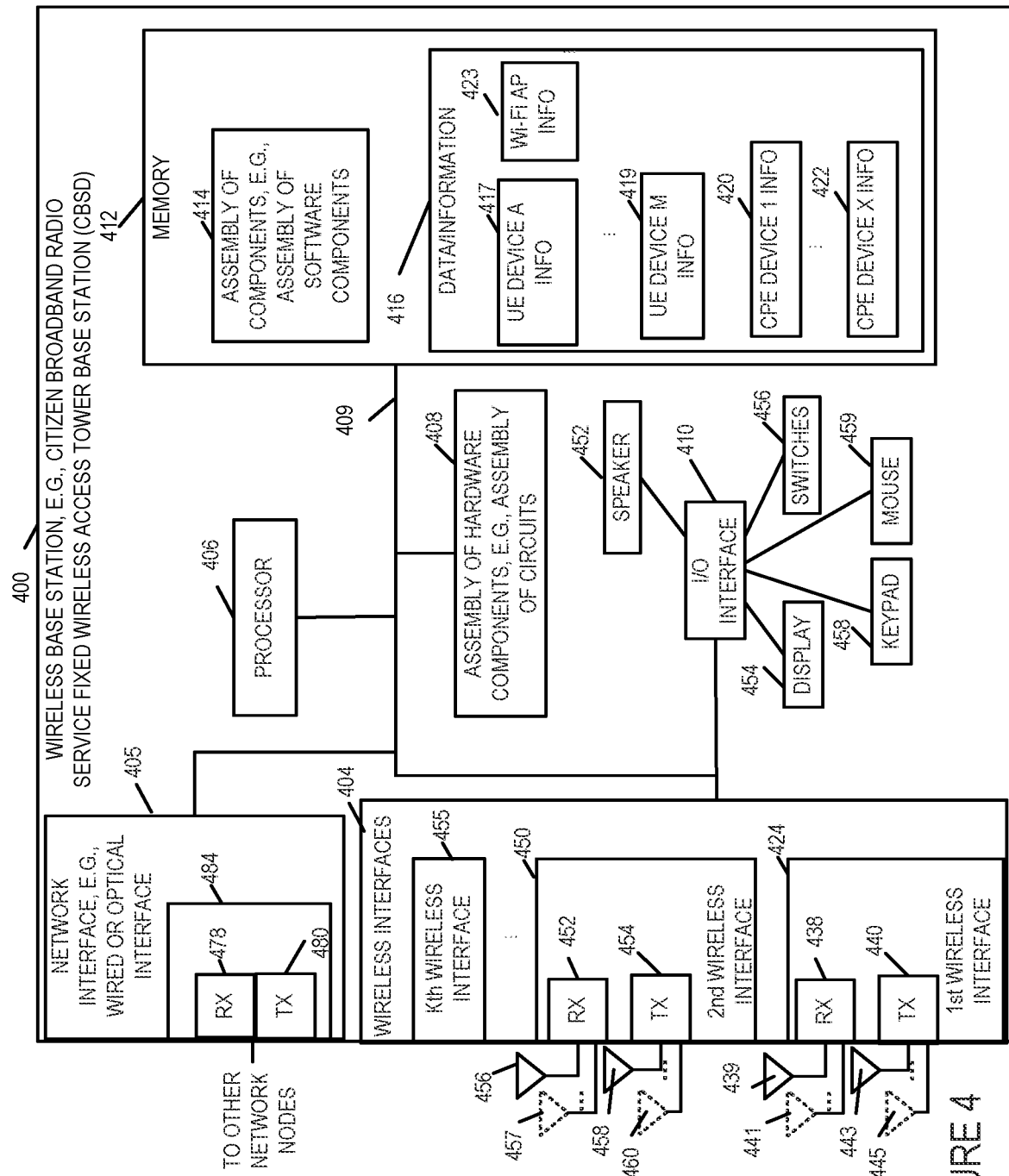
FIG. 4 illustrates details of an exemplary wireless base station, e.g., a Citizens Broadband Radio Service tower base station also referred to as Citizens Broadband Radio Service Device, in accordance with one embodiment of the present invention.

FIG. 4 is a drawing of an exemplary wireless base station 400, e.g., a Citizens Broadband Radio Service Fixed Wireless Access Tower Base Station (CBSD) 400, in accordance with an exemplary embodiment. Exemplary wireless base station 400, e.g., CBRS tower base station 400, includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, . . . , Kth wireless interface 455. The wireless interfaces are used to communicate with the CPE devices and CBRS UE devices. The first wireless interface 424 is used for example to communicate with a CPE device, e.g., CPE 1 112. The second wireless interface can be used to communicate with a CBRS enabled user equipment device, e.g., CBRS UE B1 103. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a CPE device or a CBRS user equipment device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., CPE device or a CBRS user equipment device.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless base station 400 can receive wireless signals from other wireless communications devices including a second wireless communications device, e.g., a CPE device or CBRS UE device, using the same or a different wireless protocol than the first wireless interface. Wireless transmitter 454 is coupled to one or more wireless transmit antennas (transmit antenna 1 458, . . . , transmit antenna N 460) via which the wireless base station 400 can transmit signals to other wireless communications devices including a second wireless communications device. The wireless base station network interface 405 may be coupled to a SAS system, other networks, e.g., internet, or other wireless base stations.

Memory 412 includes an assembly of components 414, e.g., an assembly of software components, and data/information 416. Data/information 416 includes CBRS UE device information corresponding to a plurality of CBRS user equipment devices (UE device A information 417, . . . , UE device M information 419 where A to M are the CBRS UE devices being serviced by the wireless base station such as for example CBRS UE B1 103, . . . CBRS UE BZ), CPE device information (CPE device 1 information 420, . . . , CPE device X information 422), and Wi-Fi Access Point information 423. While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to for example hundreds of CPE devices and thousands of user equipment devices. The CPE device information includes CPE device profile record(s), information on the RA preamble signature assigned to the CPE device, the priority level corresponding to the CPE device which is based on the CPE device profile information. In some embodiments, one or more of the wireless base stations discussed and/or shown in the Figures and/or in connection with the methods discussed herein including wireless base station 102 are implemented in accordance with the wireless base station 400.

Figure 5:
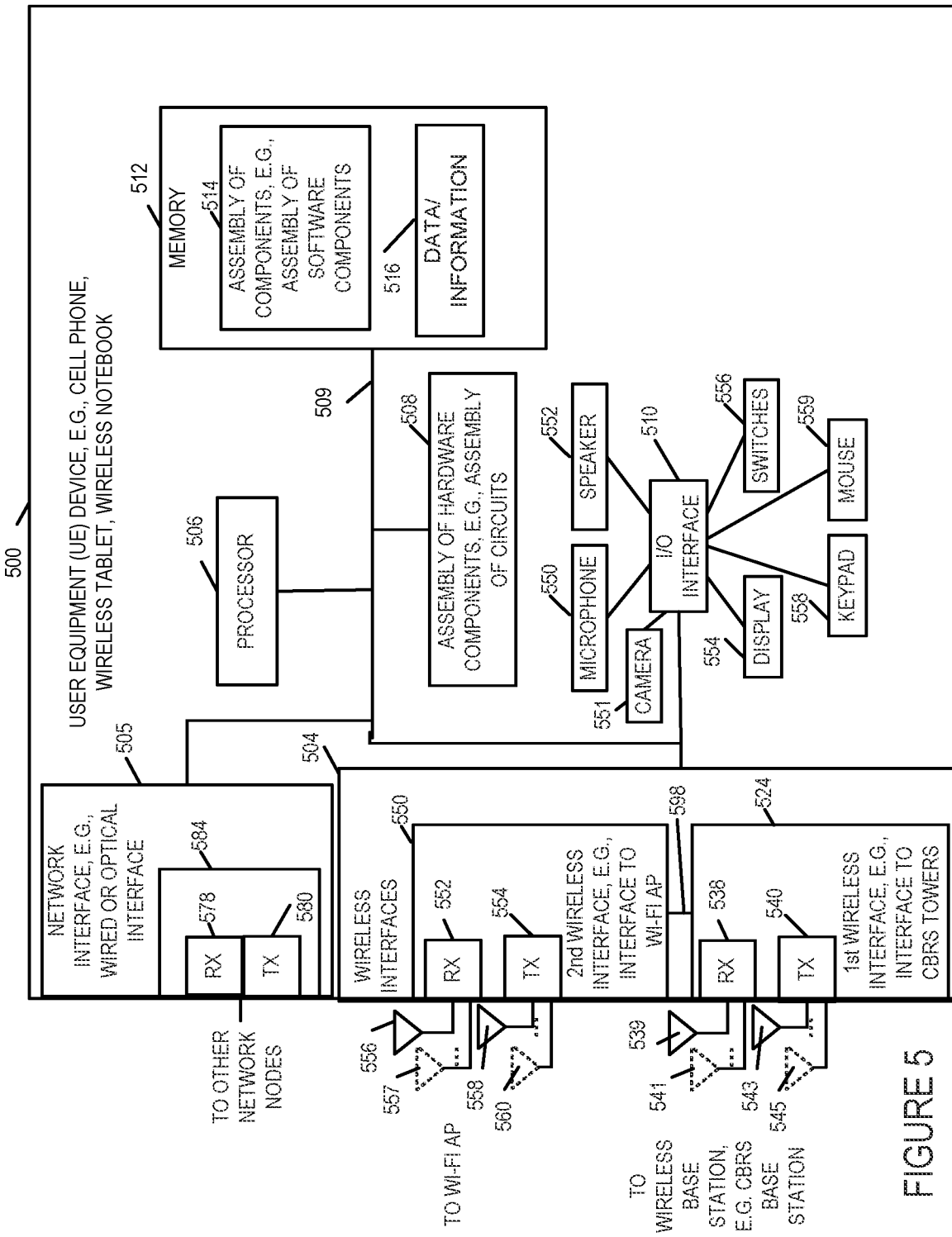
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a computer, a mobile device such as a cell phone, a smart phone, wireless tablet or wireless notebook, a smartTV, internet cable box, internet enabled device, WiFi device. UE device 500 includes WiFi device capabilities. UE device 500 in addition to having Wi-Fi device capabilities is also optionally enabled to communicate using at least one other wireless protocol, e.g., 5G wireless protocol, CBRS wireless protocol or cellular wireless protocol. The UE device 500 in some embodiments is a CBRS user equipment device operating at the 3.5 GHz band which also has Wi-Fi capabilities and can be operated to work in dual mode where it is capable of receiving packets via two different paths or two different wireless protocol connections. For example the first path or wireless protocol connection being a Wi-Fi protocol connection or channel and a second path or wireless protocol connection being via a 5G wireless protocol connection or channel, CBRS wireless protocol connection or channel or a cellular protocol connection or channel. Exemplary UE device 500 includes wireless interfaces 504, a network interface 505, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584.

Wireless interfaces 504 include a plurality of wireless interfaces including first wireless interface 524 and a second wireless interface 550. The first wireless interface 524 is used to communicate with the wireless base station, e.g., CBRS tower base station. The second wireless interface is used to communicate with a Wi-Fi Access Point. The first wireless interface 524 includes wireless receiver 538 and a wireless transmitter 540. In some embodiments, receiver 538 and transmitter 540 are part of a transceiver. In various embodiments, the first wireless interface 524 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station, e.g., wireless base station 102, e.g., CBRS tower base station or CBSD for example using 3.5 GHz bandwidth spectrum. Wireless transmitter 540 is coupled to a plurality of wireless transmit antennas (transmit antenna 1 543, . . . , transmit antenna N 545) via which the user equipment device 500 can transmit signals to other wireless communications devices including a second wireless communications device, e.g., wireless base station such as a CBRS tower base station. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including a second wireless communications device, e.g., a Wi-Fi Access Point using Wi-Fi protocol. Wireless transmitter 554 is coupled to one or more wireless transmit antennas (transmit antenna 1 558, . . . , transmit antenna N 560) via which the user equipment device 500 can transmit signals to other wireless communications devices including a second wireless communications device. The user equipment device network interface 505 may be coupled to LAN or WAN networks or routers so that the user equipment device can also obtain services via a hardwired connection in addition to through the wireless interfaces. In the exemplary embodiment the second wireless interface is a Wi-Fi wireless interface. The first wireless interface is connected or coupled to the second wireless interface via wire 598 so that the two interfaces can exchange information.

Memory 512 includes an assembly of components 514, e.g., an assembly of software components, and data/information 516.

In some embodiments, one or more of the user equipment devices shown in the figures or discussed herein for example in connection with the methods described including for example UE devices UE 1 116, UE 2 118, UE 3 119, . . . , UE M 120, UE X1 162, . . . , UE XP 164, UE Y1 191, . . . , UE YR 192, CBRS UE B1 103, . . . , CBRS UE BZ 105 are implemented in accordance with exemplary user equipment device 500. While the UE device 500 has been illustrated as a dual mode device that has two wireless interfaces 550 and 524, the UE device 500 may, and in some embodiments, is not a dual mode device but instead is a single mode operation device with a single wireless interface either wireless interface 1 524 which is enable to communicate with a wireless base station using a first wireless protocol, e.g., a 5G protocol, 4G protocol, LTE protocol or CBRS wireless protocol, or wireless interface 2 550 which is a Wi-Fi interface which is enabled to communicate with a Wi-Fi Access Point or router. For example, CBRS UE B1 103, . . . , CBRS UE BZ 105 in some embodiments include the first wireless interface 524 through which they communicate with the wireless base station 102 and do not include the second wireless interface 550 which is a Wi-Fi wireless interface. Similarly, in many embodiments, UE devices UE 1 116, UE 2 118, UE 3 119, . . . , UE M 120, UE X1 162, . . . , UE XP 164, UE Y1 191, . . . , UE YR 192 include a single wireless interface, wireless interface 550 through which they communicate with a Wi-Fi access point or router located at the customer premises at which the UE device is located.

Figure 6:
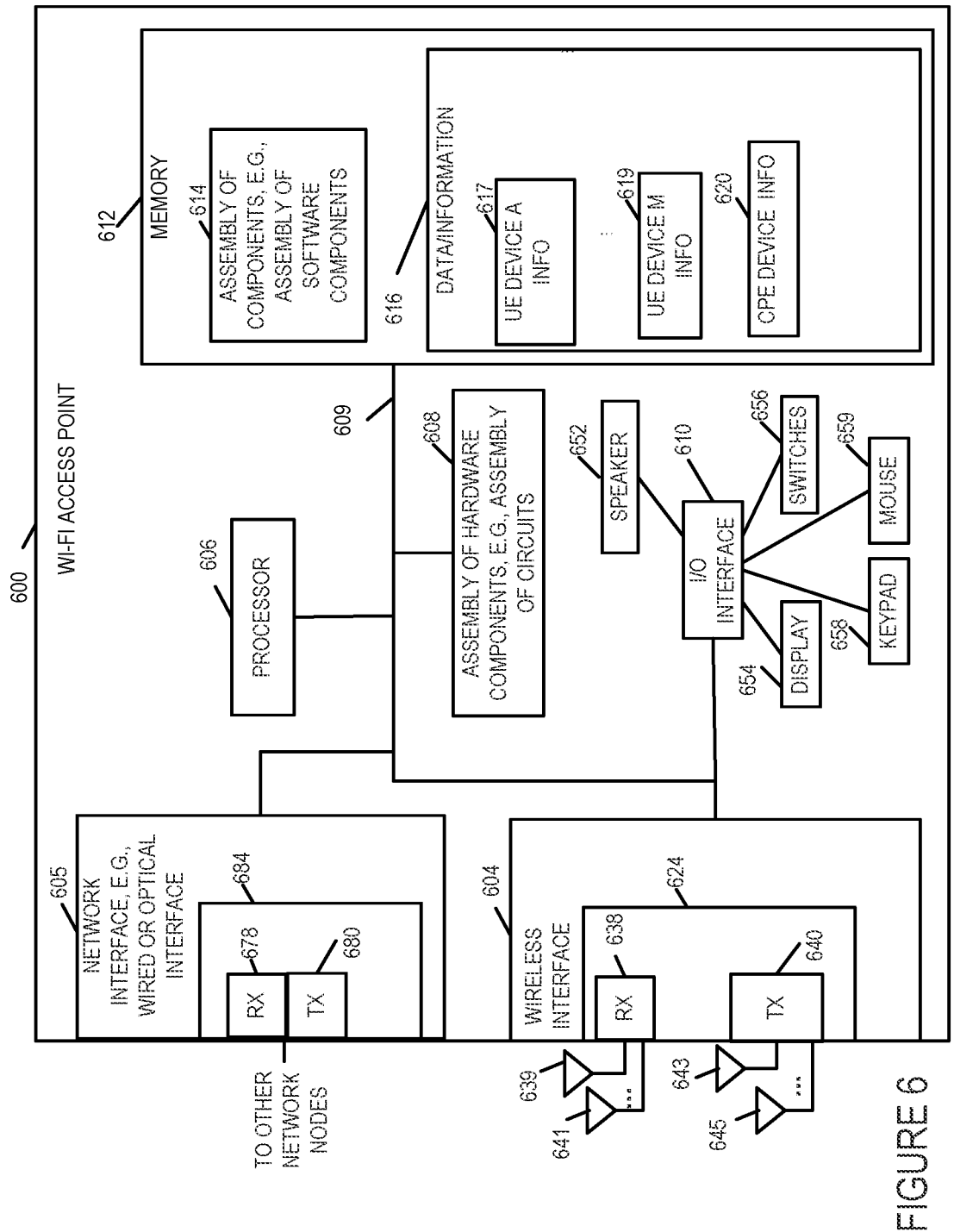
FIG. 6 illustrates details of an exemplary Wi-Fi Access Point in accordance with one embodiment of the present invention.

FIG. 6 is a drawing of an exemplary Wi-Fi Access Point 600 in accordance with an exemplary embodiment. Exemplary Wi-Fi Access Point 600 includes a wireless interface 604, e.g., a Wi-Fi interface for transmitting, receiving and processing Wi-Fi messages/packets, a network interface 605, e.g., a wired or optical interface, a processor 606, e.g., a CPU, an assembly of hardware components 608, e.g., an assembly of circuits, and I/O interface 610 and memory 612 coupled together via a bus 609 over which the various elements may interchange data and information. Wi-Fi Access Point 600 further includes a speaker 652, a display 654, switches 656, keypad 658 and mouse 659 coupled to I/O interface 610, via which the various I/O devices (652, 654, 656, 658, 659) may communicate with other elements (604, 605, 606, 608, 612) of the Wi-Fi Access Point 600. Network interface 605 includes a receiver 678 and a transmitter 680. The network interface 605 is typically connected or coupled to a wired or optical communications link or network which in turn is coupled or connected to a CPE device. In some embodiments, receiver 678 and transmitter 680 are part of a transceiver 684. Wireless interface 604 includes a wireless receiver 638 and a wireless transmitter 640. In some embodiments, receiver 638 and transmitter 640 are part of a transceiver 624. In various embodiments, wireless interface 604 includes a plurality of wireless receivers and a plurality of wireless transmitters. Wireless receiver 638 is coupled to a plurality of receive antennas (receive antenna 1 639, . . . , receive antenna M 641), via which Wi-Fi Access Point 600 can receive wireless signals from other wireless communications devices including a second wireless communications device, e.g., a UE device. Wireless transmitter 640 is coupled to a plurality of wireless transmit antennas (transmit antenna 1 643, . . . , transmit antenna N 645) via which the Wi-Fi Access Point 600 can transmit signals to other wireless communications devices e.g., a UE device.

Memory 612 includes an assembly of components 614, e.g., an assembly of software components, and data/information 616. Data/information 616 includes UE device information corresponding to a plurality of user equipment devices (UE device A information 617, . . . , UE device M information 619 where A to M are the UE devices being serviced by the Wi-Fi Access Point) and CPE device information (e.g., CPE device 1 information, CPE device 1 being the CPE device to which the Wi-Fi AP is connected to) 620. The Wi-Fi Access Point includes in some embodiments multiple wireless interfaces or a wireless interface with multiple receivers and transmitters so that it can provides wireless services to a plurality of user equipment devices. In some embodiments, one or more of Wi-Fi Access Points discussed and/or shown in the Figures and/or in connection with the methods discussed herein including Wi-Fi Access Points 122, 124, . . . , 126, 155, and 160 are implemented in accordance with the Wi-Fi Access Point 600.

Figure 7:
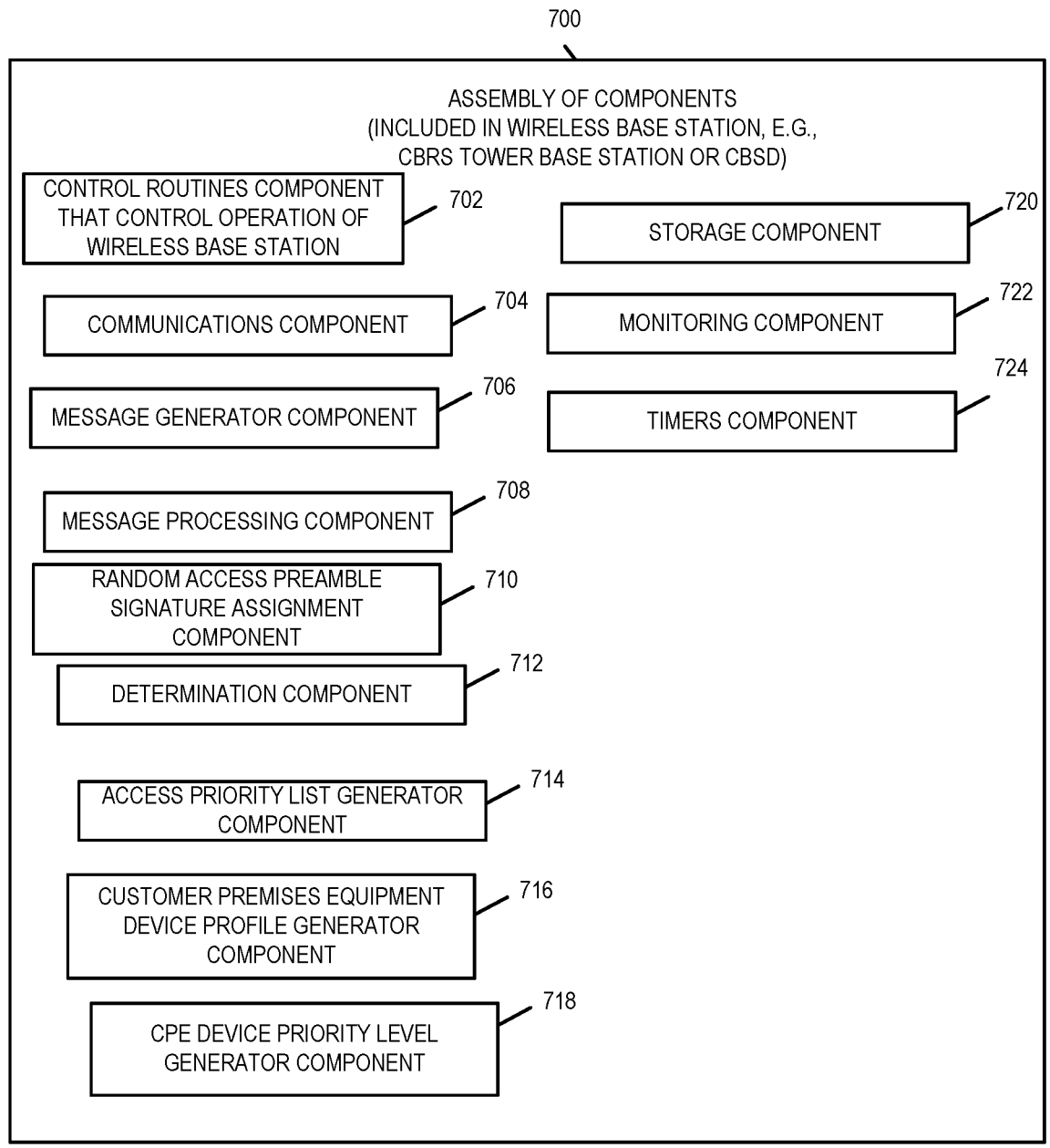
FIG. 7 illustrates an exemplary assembly of components for a wireless base station, e.g., CBRS tower base station or CBSD, in accordance with an embodiment of the present invention.

FIG. 7 is a drawing of an exemplary assembly of components 700 which may be included in a wireless base station, e.g., exemplary wireless base station 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station device 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions or operations corresponding to one or more described and/or illustrated steps of an exemplary method.

Assembly of components 700 includes a control routines component 702, a communications component 704, a message generator component 706, a message processing component 708, a random access preamble signature assignment component 710, a determination component 712, an access priority list generator component 714, a customer premises equipment device profile generator component 716, a customer premises equipment device priority level generator component 718, a storage component 720, a monitoring component 722, a timers component 724.

The control routines component 702 is configured to control operation of the wireless base station. The communications component 704 is configured to handle communications, e.g., transmission and reception of messages, and protocol signaling for the wireless base station. The message generator component 706 is configured to generate messages for transmission to other devices. The message processing component 708 is configured to process received messages and is sometimes a sub-component of communications component 704. The determination component 712 makes various determinations for the wireless base station including for example, determining the order in which to respond to a plurality of received random access preamble signals based on an access priority list, determining destinations to which to route generated and/or received messages, determining properties, characteristics and/or attributes of a CPE device such as for example, location of the customer premises equipment device, customer premises equipment device software type, version, and/or release, customer premises equipment device hardware type, version, and/or release, the amount of time during which a customer premises equipment device is connected to the wireless base station during a time period, an amount of downlink traffic communicated from the wireless base station to a customer premises equipment device during a time period, an amount of uplink traffic communicated from a customer premises equipment device to a wireless base station during a time period, the number of times the wireless base station receives a random access preamble signal from the same customer premises equipment device during a time period, the number of emergency calls received from a customer premises equipment device during a time period, the actual or an estimated number of user equipment devices being serviced by a customer premises equipment device during a time period, the number of customer equipment devices connected to the wireless base station, a priority level for customer premises equipment devices connected to the wireless base station, the percentage of the total number of dedicated random access preamble signatures available to the wireless base station that are to be reserved for assignment to customer premises equipment devices and the percentage of the total number of dedicated random access preamble signatures to be available to the wireless base station that are to be reserved for assignment to mobile user equipment devices for handover operations, the assignment of dedicated random access preamble signatures to CPE devices and/or UE devices; determining which received random access preamble signals have been received within a time window that allows, permits or requires that the wireless base station selection the order of response to the received random access preamble signals.

The access priority list generator component 714 is configured to generate an access priority list for example based on information included in CPE device profiles.

The customer premises equipment device profile generator component 716 generates customer premises equipment device profiles for example based on a CPE device's characteristics, attributes and/or properties including monitored activity.

The CPE priority level generator component 718 generates a priority level for a CPE device based on information about the CPE device such as for example properties, characteristics and/or attributes of the CPE device.

The storage component 720 controls the storage and retrieval of information and data in the memory of the wireless base station.

The monitoring component 726 monitors wireless base station activities, customer premises equipment device activities, and user equipment device activities. The monitoring of wireless base station activities include monitoring the percentage of dedicated random access preambles available for CPE devices which have been assigned. With respect to customer premises equipment devices monitoring includes for example (i) activity of customer premises equipment devices such as amount of uplink traffic, amount of downlink traffic to the device, number of emergency calls from the CPE device, location of CPE device, (ii) messages and an information exchanged with customer premises equipment devices, and/or (iii) status of connections with customer premises equipment devices.

Figure 8:
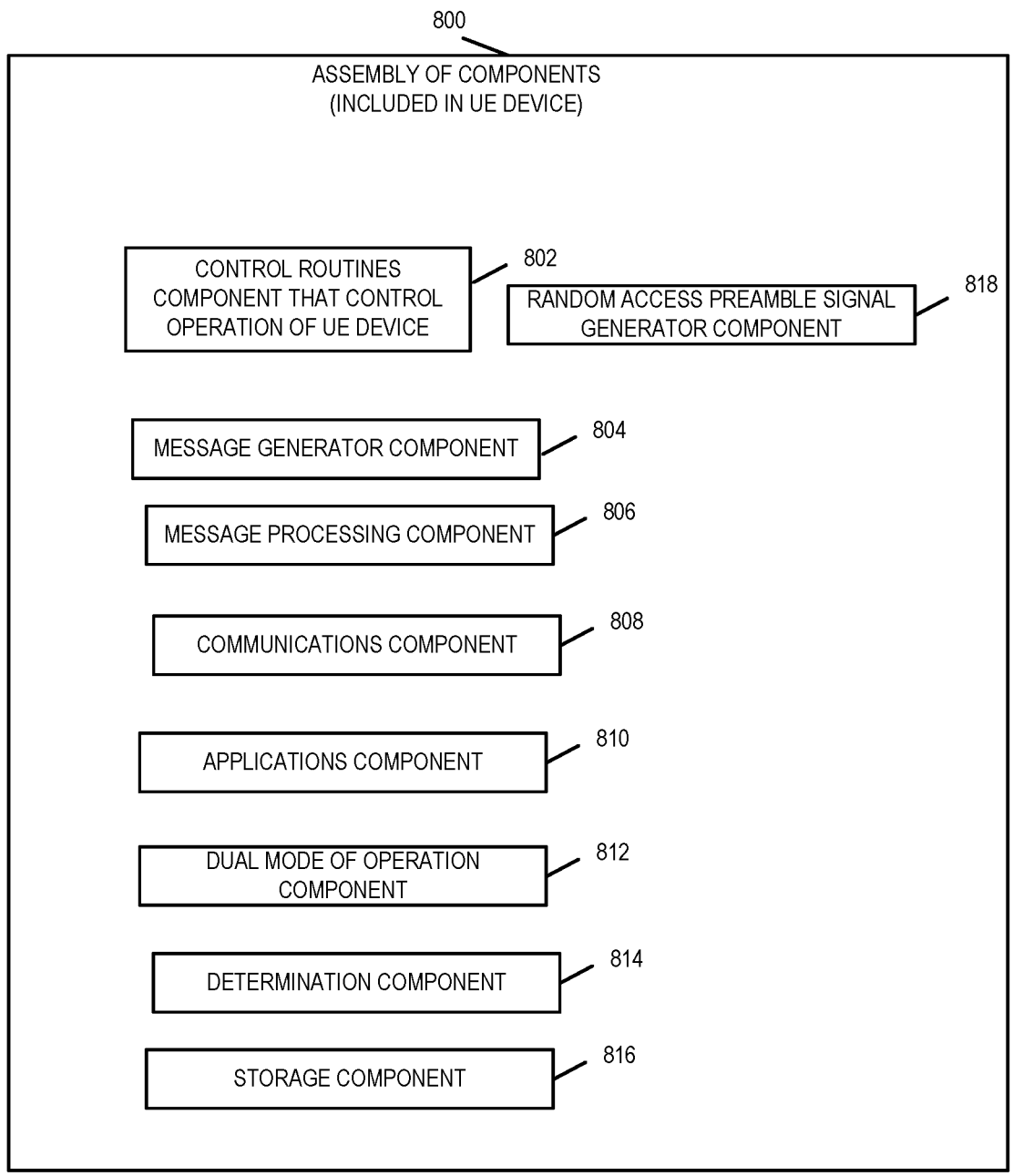
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a message processing component 806, a communications component 808, an applications component 810, an optional dual mode of operation component 812, a determination component 814, a storage component 816, and a random access preamble signal generator component 818.

The control routines component 802 is configured to control operation of the UE. The message generator component 804 is configured to generate messages for transmission to various devices including for example a Wi-Fi Access Point when the UE device is a Wi-Fi device and wireless base station (e.g., CBSD) when the device is a CBRS UE device. In some embodiments in which the UE is a dual mode of operation device it is also configured to generate messages for transmission to both wireless base stations using a first protocol (e.g., CBRS wireless protocol, 4G wireless protocol or 5G wireless protocol and to a Wi-Fi access point using a second wireless protocol, i.e., a Wi-Fi wireless protocol. The message processing component 806 is configured to process messages received from other devices, e.g., a wireless base station or a Wi-Fi Access Point. In some embodiments, the message processing component 806 is a sub-component of the communications component 808. The communications component 808 is configured to handle communications, e.g., receipt and transmission of signals and provide protocol signal processing for one or more protocols for the UE. The applications component 810 is configured to provide various application services for the UE device, e.g., voice over internet protocol calling services, video on demand services, media download services, conferencing services, internet access and web browsing services, etc. The dual mode of operation component 812 is an optional component which is present in dual mode operation devices that operate using two different wireless protocols. The dual mode of operation component 812 is configured to establish different transmission paths for receiving data packets using different wireless protocols (e.g., CBRS or 5G wireless protocol and Wi-Fi protocol) depending on the selection of the mode of operation e.g. The determination component 814 is responsible for making determinations at the user equipment device including for example the selection of the mode of operation (e.g., CBRS or 5G wireless protocol and Wi-Fi protocol). The storage component 816 controls the storage and retrieval of information and data in the memory of user equipment device. The random access preamble signal generator component generates a random access preamble signal using information provided by a wireless base station. In some embodiments, the random access preamble signal generator component is part of the message generator component 804.

Figure 9:
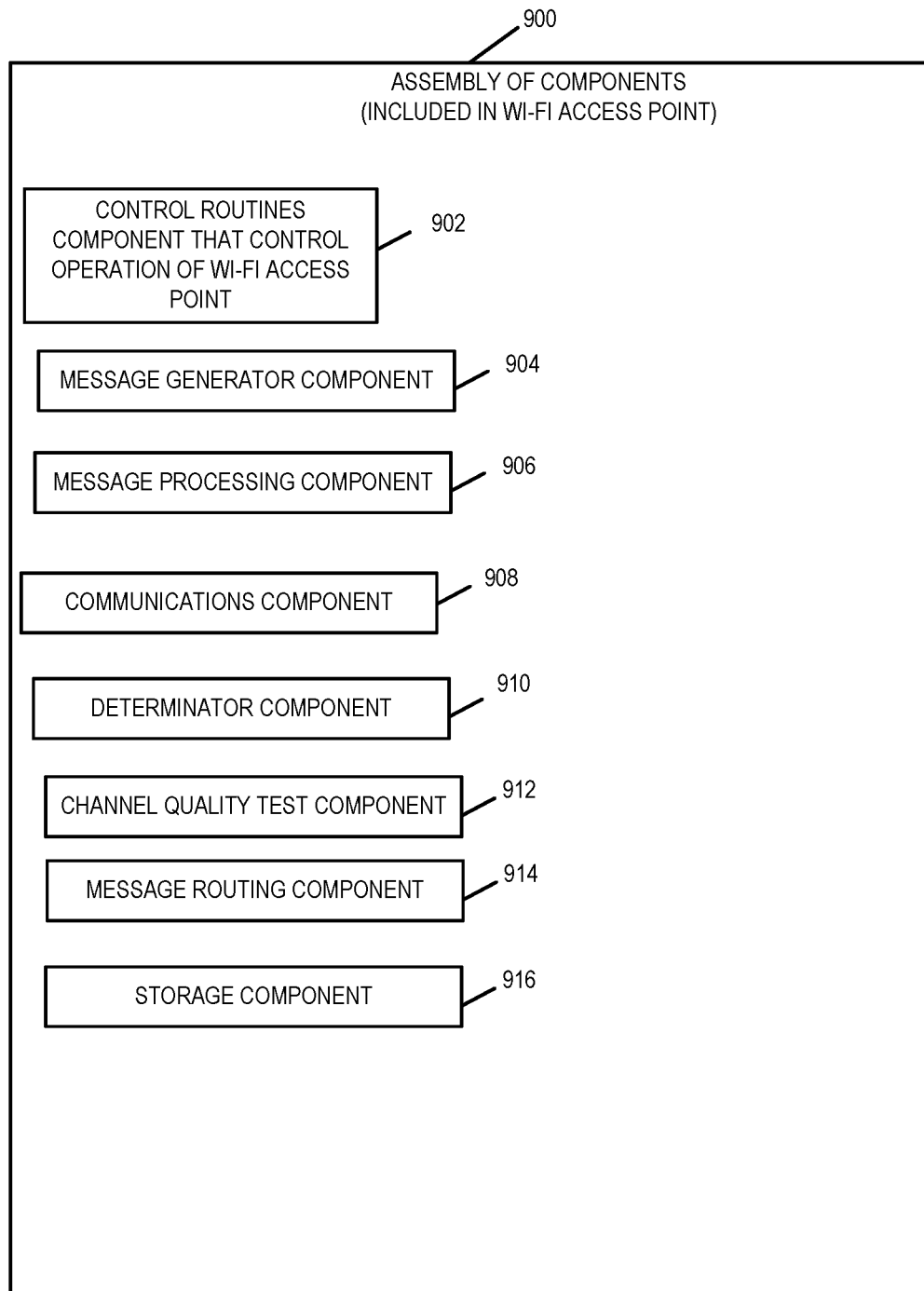
FIG. 9 illustrates an exemplary assembly of components for a Wi-Fi Access Point in accordance with an embodiment of the present invention.

FIG. 9 is a drawing of an exemplary assembly of components 900 which may be included in an exemplary Wi-Fi Access Point, e.g., exemplary Wi-Fi Access Point 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the Wi-Fi Access Point 600, with the components controlling operation of Wi-Fi Access Point 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the Wi-Fi Access Point 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, a message processing component 906, a communications component 908, a determinator component 910, channel quality test component 912, a message routing component 914 and a storage component 916.

The control routines component 902 is configured to control operation of the Wi-Fi Access Point. The message generator component 904 is configured to generate messages for transmission to a CPE device and user equipment devices. The message processing component 906 processes received messages and takes actions based on the processed messages. The communications component 908 is configured to handle communications between the Wi-Fi Access Point and other devices, e.g., CPE device and user equipment devices. The determinator component 910 makes determinations for the Wi-Fi Access Point including which UE devices are to be provided services and which are not. The channel quality test component 912 performs communications channel, e.g., Wi-Fi channels/connections, quality and signaling condition tests. The message routing component 914 routes messages received at the Wi-Fi Access Point toward their intended destinations. The storage component 916 is responsible for the storage and retrieval of data and information in the memory of the Wi-Fi Access Point.

Figure 10:
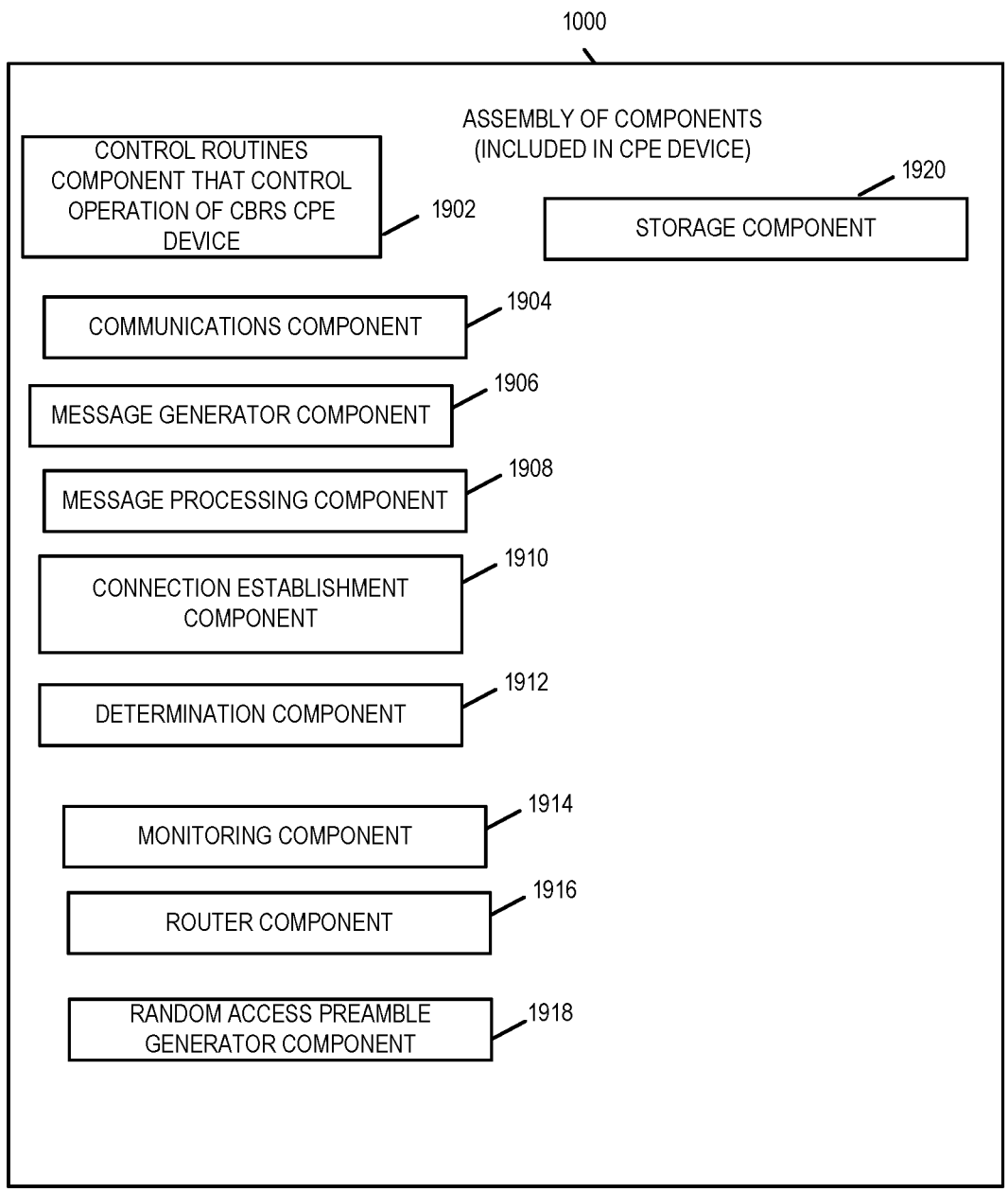
FIG. 10 illustrates an exemplary assembly of components for a customer premises equipment (CPE) device, e.g., CBRS CPE device, in accordance with an embodiment of the present invention.

FIG. 10 is a drawing of an exemplary assembly of components 1000 which may be included in an exemplary CPE device, e.g., exemplary CPE device 300 of FIG. 3, in accordance with an exemplary embodiment. The components in the assembly of components 1000 can, and in some embodiments are, implemented fully in hardware within a processor, e.g., processor 306, e.g., as individual circuits. The components in the assembly of components 1000 can, and in some embodiments are, implemented fully in hardware within the assembly of hardware components 308, e.g., as individual circuits corresponding to the different components. In other embodiments some of the components are implemented, e.g., as circuits, within processor 306 with other components being implemented, e.g., as circuits within assembly of components 308, external to and coupled to the processor 306. As should be appreciated the level of integration of components on the processor and/or with some components being external to the processor may be one of design choice. Alternatively, rather than being implemented as circuits, all or some of the components may be implemented in software and stored in the memory 312 of the CPE device 300, with the components controlling operation of CPE device 300 to implement the functions corresponding to the components when the components are executed by a processor e.g., processor 306. In some such embodiments, the assembly of components 1000 is included in the memory 312 as assembly of software components 314. In still other embodiments, various components in assembly of components 1000 are implemented as a combination of hardware and software, e.g., with another circuit external to the processor providing input to the processor which then under software control operates to perform a portion of a component's function.

When implemented in software the components include code, which when executed by a processor, e.g., processor 306, configure the processor to implement the function corresponding to the component. In embodiments where the assembly of components 1000 is stored in the memory 312, the memory 312 is a computer program product comprising a computer readable medium comprising code, e.g., individual code for each component, for causing at least one computer, e.g., processor 306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the CPE device 300 or elements therein such as the processor 306, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method.

Assembly of components 1000 includes a control routines component 1902, a communications component 1904, message generator component 1906, a message processing component 1908, a connection establishment component 1910, a determination component 1912, a monitoring component 1914, a router component 1916, a random access preamble generator component 1918, and a storage component 1920.

The control routines component 1902 controls the operation of the CPE device. The communications component 1904 performs operations for handling communications with other devices including generation, transmission, receiving, and processing messages, establishing connections, signal processing for different communications protocols. The message generator component 1906 generates messages and signals, e.g., messages/signals to be sent to the Wi-Fi access points, UE devices, wireless base station including access request signals/message, and response/acknowledgement messages. In some embodiments, the message generator component 1906 is a sub-component of communications component 1904. The message processing component 1908 processes received messages and performs operations in response to received messages.

The connection establishment component 1910 handles establishment and termination of communications connections, e.g., device to device communications connections between the wireless base station and the CPE device and the CPE device and the Wi-Fi Access Points. In some embodiments, the connection establishment component 1910 is a sub-component of communications component 1904.

The determination component 1912 makes various determinations for the CPE device whether to generate a non-dedicated random access preamble signal or a dedicated random access preamble signal.

The monitoring component 1914 monitors for various conditions e.g., conditions indicative of an connection between the wireless base station and the CPE device being terminated, lost or severed. The router component 1916 routes received messages to destination devices or to the next hop on the path to the destination. The random access preamble generator component generates random access preamble signals, e.g., dedicated or non-dedicated random access preamble signals. The random access preamble generator component in some embodiments is a sub-component of the connection establishment component 1912 or the message generator component 1906. The storage component 1920 is responsible for the management of the storage and retrieval of data and information in the memory of the CPE device.

Figure 2A:
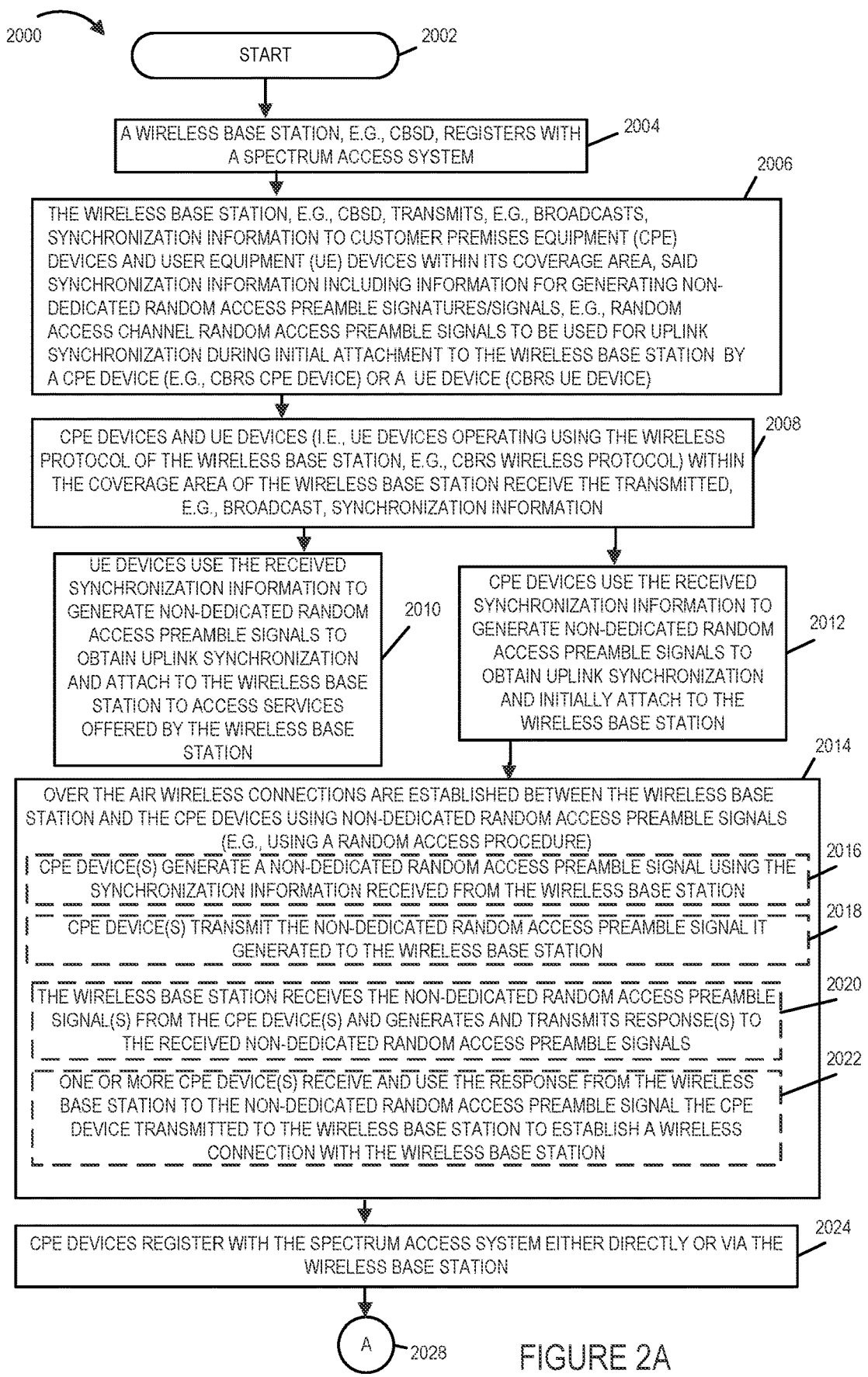
FIG. 2A illustrates the steps of the first part of an exemplary method in accordance with one embodiment of the present invention.
Figure 2B:
FIG. 2B illustrates the steps of the second part of an exemplary method in accordance with one embodiment of the present invention.
Figure 2C:
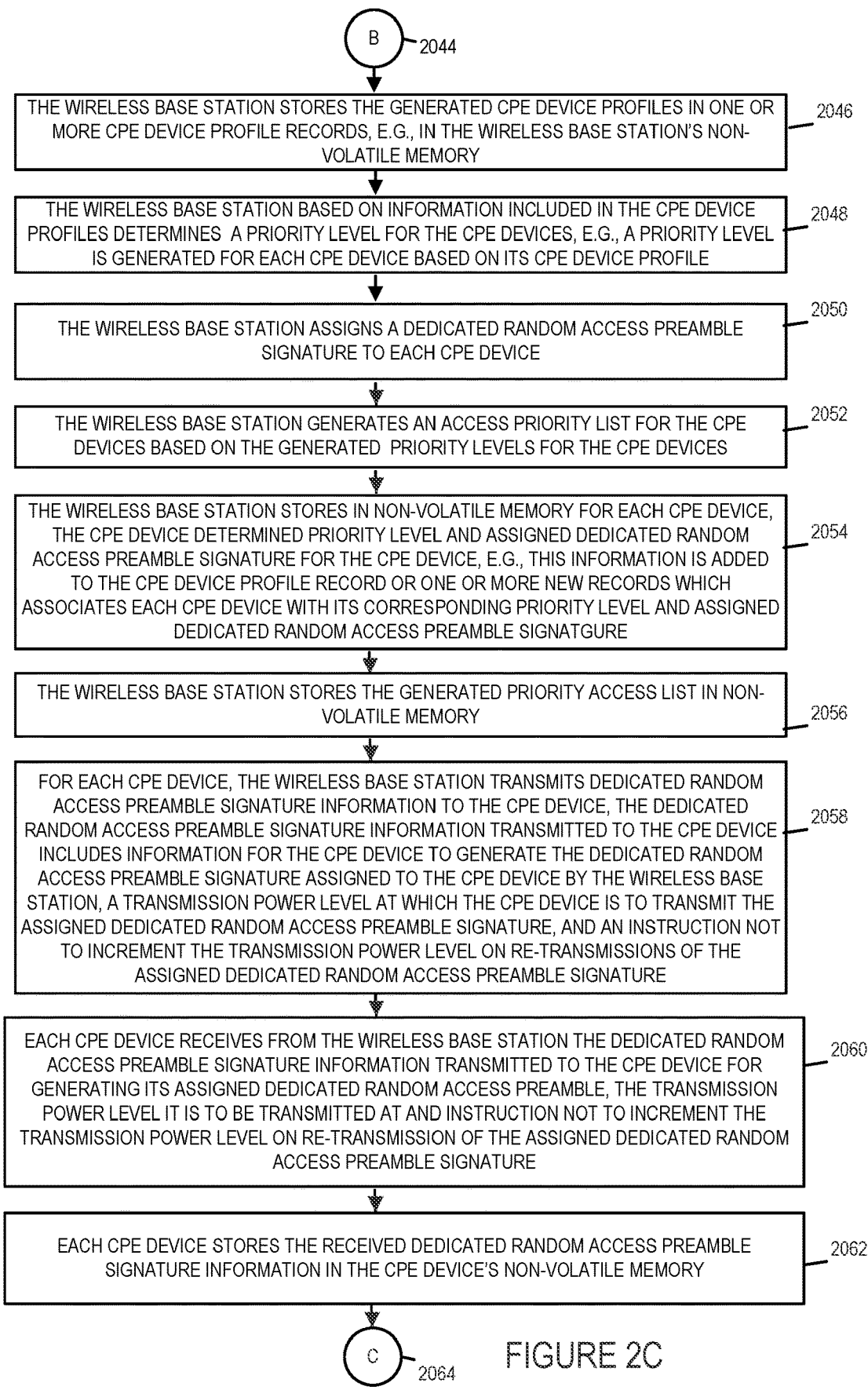
FIG. 2C illustrates the steps of the third part of an exemplary method in accordance with one embodiment of the present invention.
Figure 2D:
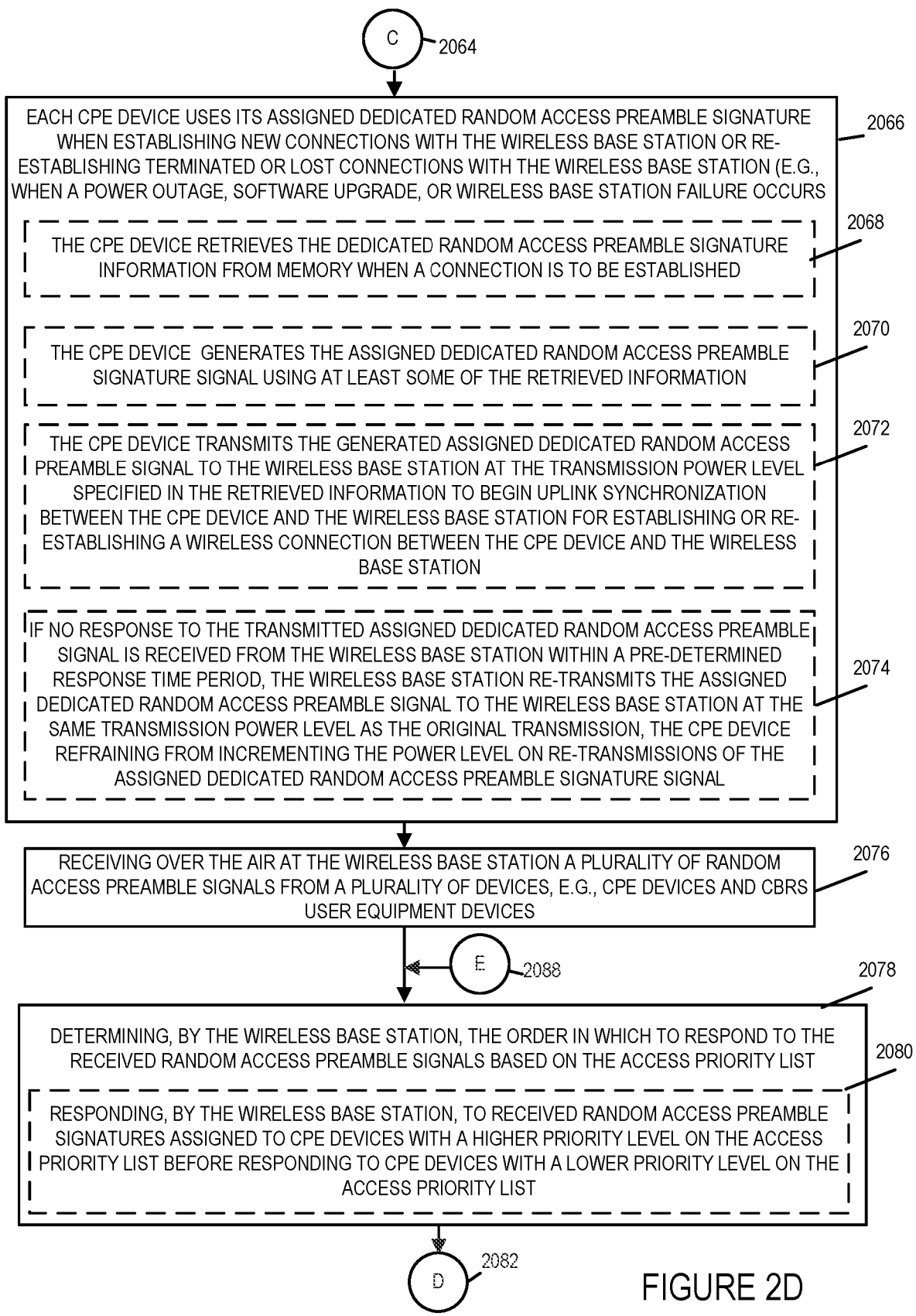
FIG. 2D illustrates the steps of the fourth part of an exemplary method in accordance with one embodiment of the present invention.
Figures 2, 2E:
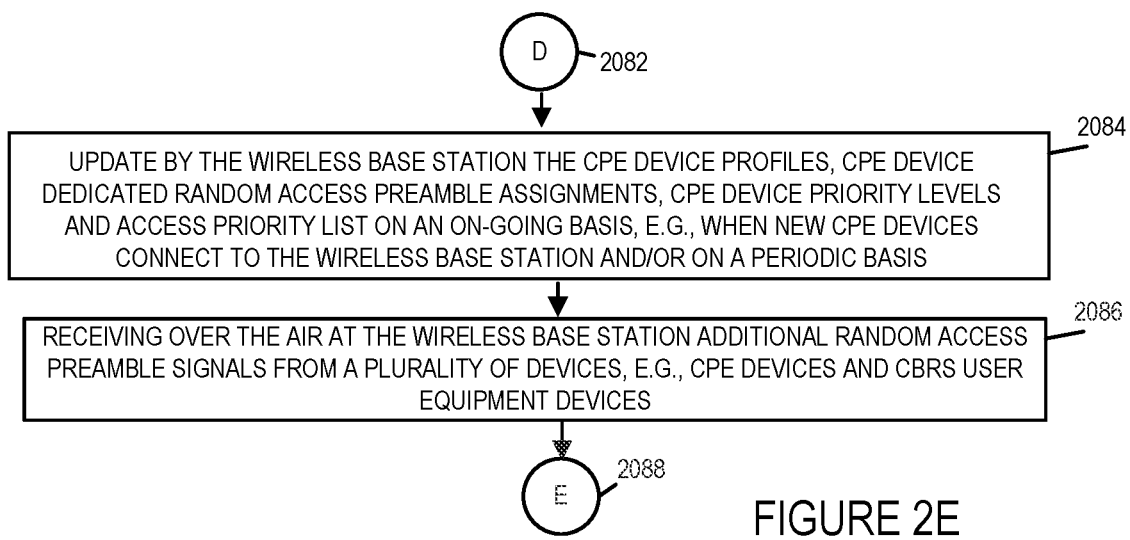
FIG. 2 illustrates the combination of FIGS. 2A, 2B, 2C, 2D, and 2E.
FIG. 2E illustrates the steps of the fifth part of an exemplary method in accordance with one embodiment of the present invention.

FIG. 2, which comprises the combination of FIGS. 2A, 2B, 2C, 2D, and 2E illustrates an exemplary method 2000. FIG. 2A illustrates the steps of the first part of an exemplary method 2000 in accordance with one embodiment of the present invention. FIG. 2B illustrates the steps of the second part of an exemplary method 2000 in accordance with one embodiment of the present invention. FIG. 2C illustrates the steps of the third part of an exemplary method 2000 in accordance with one embodiment of the present invention. FIG. 2D illustrates the steps of the fourth part of an exemplary method 2000 in accordance with one embodiment of the present invention. FIG. 2E illustrates the steps of the fifth part of an exemplary method 2000 in accordance with one embodiment of the present invention.

For explanatory purposes the exemplary method 2000 will be explained in connection with the exemplary communications system 100 illustrated in FIG. 1 although it should be understand that the method may be implemented using other systems and other system configurations then those illustrated in FIG. 1. While it will be readily understood that additional steps and signaling are performed in connection with communicating information, messages, and packets between devices, the method 2000 focuses on and discusses the steps and signaling for understanding the invention.

The method 2000 shown in FIG. 2 will now be discussed in detail. The method starts in start step 2002 shown on FIG. 2A with the devices in system 100 being initialized and becoming operational. Operation proceeds from step 2002 to step 2004.

In step 2004, a wireless base station, e.g., CBSD 1 102 of system 100, registers with a spectrum access system, e.g., SAS 1 110, and obtains frequency spectrum in 3.5 GHz bandwidth to use for communicating with devices in a first wireless protocol format, e.g., a 5G wireless protocol format, CBRS wireless protocol packet format, or a cellular wireless protocol format. Operation proceeds from step 2004 to step 2006.

In step 2006, the wireless base station, e.g., CBSD 1 102, transmits, e.g., broadcasts, synchronization information to customer premises equipment devices (CPE) devices (e.g., CPE 1, 112, CPE 2 152, . . . , CPE X 158) and user equipment device, e.g., CBRS UE B1 103, . . . , CBRS UE BZ 105) within its cell or coverage area over wireless spectrum assigned to the wireless base station by the Spectrum Access System, e.g., SAS 1 110. The synchronization information incudes information for generating non-dedicated random access preamble signatures/signals, e.g., random access channel random access preamble signatures/signals that are used for uplink synchronization during initial attachment to the wireless base station by a CPE device (e.g., CPE device 1 112, CPE device 2 152, . . . , CPE device X 158 and/or a user equipment device (e.g., CBRS UE B1 103, . . . , CBRS UE BZ). Operation proceeds from step 2006 to step 2008.

In step 2008, CPE devices and UE devices (e.g., UE devices operating using the wireless protocol of the wireless base station for example CBRS wireless protocol) within the coverage area of the wireless base station receive the transmitted, e.g., broadcast, synchronization information. Operation proceeds from step 2008 to steps 2010 and 2020.

In step 2010, UE devices use the received synchronization information to generate non-dedicated random access preamble signals to obtain uplink synchronization and attach/connect to the wireless base station to access services offered/provided by the wireless base station.

In step 2012, the CPE devices use the received synchronization information to generate non-dedicated random access preamble signals to obtain uplink synchronization and initially attach/connect to the wireless base station. Operation proceeds from step 2012 to step 2014.

In step 2014, over the air wireless connections are established between the wireless base station and the CPE devices using non-dedicated random access preamble signals (e.g., using a random access connection procedure). In some embodiments, step 2014 includes one or more sub-steps 2016, 2018, 2020, 2022, and 2024.

In sub-step 2016, anon-dedicated random access preamble signal is generated by a CPE device using the synchronization information received from the wireless base station.

In sub-step 2018, the generated non-dedicated random access preamble signal is transmitted from the CPE device to the wireless base station.

Sub-step 2016 and 2018 are typically performed by one or more of the CPE devices and/or each of the CPE devices which received the synchronization information from the wireless base station.

In sub-step 2020, the wireless base station receives non-dedicated random access preamble signals from one or more CPE devices and generates and transmits responses to the received non-dedicated random access preamble signals.

In sub-step 2022, one or more of the CPE devices receive a response from the wireless base station to the non-dedicated random access preamble signal it transmitted to the wireless base station and using the received response establish a wireless connection with the wireless base station. Typically, each of the CPE devices establish a connection with the wireless base station using non-dedicated random access preamble signals and the response from the wireless base station using a pre-determined random access procedure.

Operation proceeds from step 2014 to step 2024. In step 2024, CPE devices register with the spectrum access system, e.g., SAS 1 110, either directly or via the wireless base station wherein the wireless base station transmits CPE device registration information to the spectrum access system for CPE devices attached or connected to the wireless base station. Operation proceeds from step 2024 to step 2028 shown on FIG. 2B via connection node A 2026.

In step 2028, once the CPE devices and wireless base stations have established a connection, the wireless base station begins providing services to the CPE devices and the UE devices connected to the CPE devices via the CPE devices. For example, in system 100, wireless base station 102 communicates with and provides services to CPE 1 112 via the 3.5 GHz wireless link 166, CPE 2 152 via wireless communications link 168, . . . , CPE X 158 via wireless communications link 169. The UE 1 116, UE 2 118, UE 3 119, . . . , UE M 120 devices are provided services from the wireless base station 102 via the CPE 1 device 112 which communicates with UE 1, UE 2, UE 3, . . . , UE M via WI-FI connections. The UE Y1 191, . . . , UE YR 192 devices are provided services from the wireless base station 102 via the CPE 2 device 152 which communicates with UE Y1 191, . . . , UE YR 192 via WI-FI connections. The UE X1 162, . . . , UE XP 164 devices are provided services from the wireless base station 102 via the CPE X device 158 which communicates with UE X1 162, . . . , UE XP 164 via WI-FI connections. Operation proceeds from step 2028 to step 2030.

In step 2030, CPE device profiles are generated by the wireless base station for one or more of the CPE devices which attach/connect to the wireless base station. Typically, a CPE device profile is created for each CPE device which attaches/connects to the wireless base station. Table 1200 shown in FIG. 12 illustrates an exemplary set of CPE device profile records which are stored in memory, e.g., non-volatile memory at the wireless base station. In some embodiments, step 2030 includes one or more of the sub-steps 2032, 2034, 2036, 2038, 2040, and 2042.

In sub-step 2032, during a first pre-determined time period (e.g., a pre-determined CPE device time period, the wireless base station monitors the activity of CPE devices which have attached/connected to the wireless base station.

In sub-step 2034, the wireless base station generates CPE device profiles, each CPE device profile including at least one CPE device identifier which identifies the CPE device to which the profile corresponds. The CPE device profile further includes one or more attributes and/or properties of the CPE device. Attributes and/or properties of a CPE device which may be, and in some embodiments are, included in a CPE device profile include: (i) location information, e.g., geographical location of the CPE device, distance from the wireless base station, and/or customer premises on which the CPE device is located; (ii) CPE device hardware type, hardware version and/or hardware release; (iii) CPE device software type, version and/or release; (iv) an amount of time during the first pre-determined time period during which the CPE device is connected to the wireless base station; (v) an amount of downlink traffic (e.g., downlink data and/or control channel traffic) communicated from the wireless base station to the CPE device during the first pre-determined time period, (vi) an amount of uplink traffic communicated to the wireless base station from the CPE device (e.g., uplink data and/or control channel traffic) communicated from the CPE device to the wireless base station during the first pre-determined time period; (vii) number of times the wireless base station received a random access preamble signal from the CPE device during the first pre-determined time period and/or number of times the wireless connection between wireless base station and the CPE device is terminated/fails and re-established during the first pre-determined time period; (viii) number of emergency calls received from the CPE device during the first pre-determined time period; (ix) actual and/or estimated number of user equipment devices being serviced by the CPE device during the first pre-determined time period; and/or (x) level and/or quality of service to be provided to the CPE device (e.g., as specified by a contract).

In sub-step 2036, the wireless base station generates CPE device profiles based at least in part on information obtained by monitoring activity of CPE devices and/or information contained in messages exchanged with the CPE devices during the first pre-determined time period.

In sub-step 2038, the wireless base station generates CPE device profiles based on information obtained from a spectrum access system.

In sub-step 2040, the wireless base station generates CPE device profiles based on information obtained from CPE devices and/or users including for example CPE device configuration information.

In sub-step 2042, the wireless base station generates CPE device profiles based on information received from the wireless network operator, e.g., service contract information.

In some embodiments, the CPE devices profiles are generated by the wireless base stations using one or more of the following: (i) information obtained by monitoring activity of CPE devices and/or information contained in messages exchanged with the CPE devices during the first pre-determined time period, (ii) information obtained from a spectrum access system, (iii) information obtained from CPE devices and/or users including for example CPE device configuration information, and/or (iv) information received from the wireless network operator, e.g., service contract information.

Operation proceeds from step 2030 to step 2046 shown on FIG. 2C via connection node B 2044.

In step 2046, the wireless base station stores the generated CPE device profiles in one or more CPE device profile records, e.g., in the wireless base station's non-volatile memory. Operation proceeds from step 2046 to step 2048.

In step 2048, the wireless base station based on information in the CPE device profiles determines a priority level for the CPE devices, e.g., for each of the CPE devices. Operation proceeds from step 2048 to step 2050.

In step 2050, the wireless base station assigns a dedicated random access preamble signature to the CPE devices. Operation proceeds from step 2050 to step 2052.

In step 2052, the wireless base station generates an access priority list for the CPE devices based on the generated priority levels for the CPE devices. Operation proceeds from step 2052 to step 2054.

Figure 13:
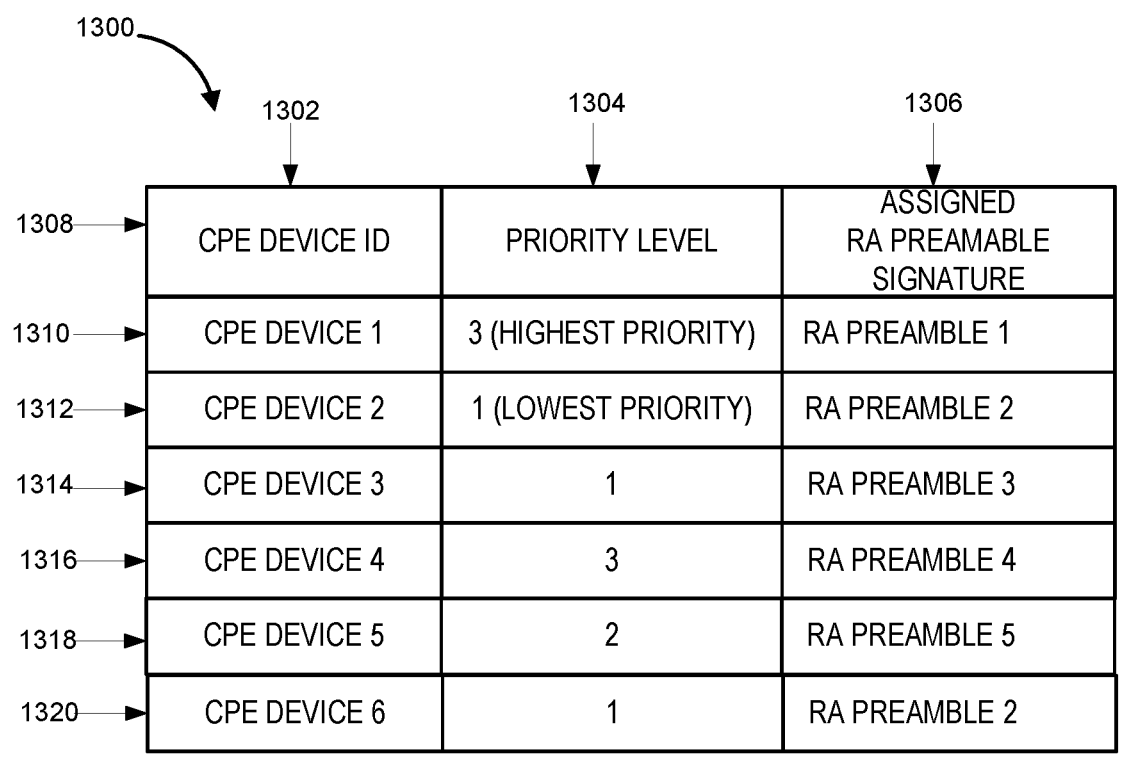
FIG. 13 illustrates an exemplary table of CPE device random access preamble signature assignments and priority level generated and/or used by a wireless base station.

In step 2054, the wireless base station stores in non-volatile memory for the CPE device determined priority level and assigned dedicated random access preamble signature for the CPE device, e.g., this information may be, and in some embodiments is added to the CPE device profile record or one or more new records which associates each CPE device with its corresponding priority level and assigned dedicated random access preamble signature. This is typically done for each CPE device for which a priority level is determined. The information in column 1204 of table 1200 illustrated in FIG. 12 shows an example of the priority level determined for each CPE device being stored in the CPE device priority profile record. Table 1300 of FIG. 13 illustrates an example of the storage of records associating a CPE device with its corresponding determined priority level and assigned dedicated random access preamble signature which may be, and in some embodiments is, stored in non-volatile memory in the wireless base station. Operation proceeds from step 2054 to step 2056.

In step 2056, the wireless base station stores the generated priority access list in non-volatile memory. Operation proceeds from ste p 2056 to step 2058.

In step 2058, the wireless base station transmits, to the CPE device to which a dedicated random access preamble signature was assigned, dedicated random access preamble signature information corresponding to the assigned dedicated random access preamble signature. In some embodiments, for each CPE device, the wireless base station transmits dedicated random access preamble signature information to the CPE device. The dedicated random access preamble information signature information includes information for the CPE device to generate the dedicated random access preamble signature assigned the CPE device by the wireless base station. In some embodiments, the dedicated random access preamble signature information also includes a transmission power level at which the CPE device is to transmit the assigned dedicated random access preamble signature. In some embodiments, the dedicated random access preamble signature information includes an instruction not to increment the transmission power level on re-transmissions of the assigned dedicated random access preamble signature. Operation proceeds from step 2058 to step 2060.

In step 2060, CPE devices receive from the wireless base station the dedicated random access preamble signature information transmitted to the CPE device. Each of the CPE devices receiving the dedicated random access preamble signature information for generating the receiving CPE device's assigned dedicated random access preamble signature, the transmission power level the CPE device is to be transmitted at when that information is included in the dedicated random access preamble signature information and the instruction not to increment the transmission power level on re-transmission of the assigned dedicated random access preamble signature when that instruction is included in the dedicated random access preamble signature information. Operation proceeds from step 2060 to step 2062.

In step 2062, CPE devices, e.g., each of the CPE devices which receives dedicated random access preamble signature information, stores the received dedicated random access preamble signature information in the CPE device's non-volatile memory. Operation proceeds from step 2062 to step 2066 shown on FIG. 2D via connection node C 2064.

In step 2066, the CPE devices each use their assigned dedicated random access preamble signatures when establishing new connection with the wireless base station or re-establishing terminated or lost connections with the wireless base station (e.g., when a power outage, software upgrade, and/or wireless base station failure occurs. In some embodiments, step 2066 includes one or more sub-steps 2068, 2070, 2072, 2074.

In sub-step 2068, the CPE device retrieves the dedicated random access preamble signature information from memory when a connection is to be established.

In sub-step 2070, the CPE device generates the assigned dedicated random access preamble signature signal using at least some of the retrieved information.

In sub-step 2082, the CPE device transmits the generated assigned dedicated random access preamble signature signal to the wireless base station at the transmission power level specified in the retrieved information to begin uplink synchronization between the CPE device and the wireless base station for establishing or re-establishing a wireless connection between the CPE device and the wireless base station.

In sub-step 2074, if or on those occurrences when no response to the transmitted assigned dedicated random access preamble signature signal is received from the wireless base station within a pre-determined response time period, the wireless base station re-transmits the assigned dedicated random access preamble signature signal to the wireless base station at the same transmission power level as the original transmission, the CPE device refraining from incrementing the power level on re-transmissions of the assigned dedicated random access preamble signature signal. By refraining from increasing the transmission power level on re-transmission signal interference with other signals being exchanged between the other CPE devices and UE devices and the wireless base station and/or other wireless base station in the area is reduced. Operation proceeds from step 2066 to step 2076.

In step 2076, the wireless base station receives over the air a plurality of random access preamble signature signals from a plurality of devices, e.g., CPE devices and CBRS user equipment devices. Operation proceeds from step 2076 to step 2078.

In step 2078, the wireless base station determines the order in which to respond to the received random access preamble signature signals based on the access priority list. In some embodiments, step 2078 includes sub-step 2080.

In sub-step 2080, the wireless base station responds to the received random access preamble signatures assigned to CPE devices with a higher priority level on the access priority list before responding to CPE devices with a lower priority on the access priority list.

Operation proceeds from step 2078 to step 2084 shown on FIG. 2E via connection node 2082. In step 2084, the wireless base station updates the CPE device profiles, CPE device dedicated random access preamble assignments, CPE device priority levels and access priority list on an on-going basis, e.g., when new CPE devices connect to the wireless base and/or on a periodic basis. Operation proceeds from step 2084 to step 2086.

In step 2086, the wireless base station receives over the air additional random access preamble signals from a plurality of devices, e.g., CPE devices and CBRS user equipment devices. Operation proceeds from step 2086 via connection node E 2088 to step 2078 wherein processing continues as previously described with the additional random access preamble signals being processed as previously described in connection with the plurality of random access preamble signals. Operation proceeds from step 2078 back to step 2084 and the method 200 continues as previously described.

The method 2000 provides the technological solution of how to provide prioritized access to customer equipment devices and user equipment devices attempting to obtain wireless data services, e.g., broadband services, from wireless base station concurrently or within a pre-determined time period while also eliminating, reducing and/or minimizing the interference caused when devices increment power levels on random access preamble signal re-transmissions. The various embodiments described in connection with method 2000 provide new and novel methods for efficiently and effectively managing access to wireless base stations so that data services can be provided to subscribers and/or user equipment devices located at the customer premises via wireless connections on a priority basis.

FIG. 11 illustrates an exemplary table 1100 identifying a set of random access preamble signatures available for use at a wireless base station with corresponding information regarding type of usage. Table 1100 of FIG. 11 illustrates an exemplary wireless base station set of random access preamble signatures. The set of random access preamble signatures include a limited number of dedicated random access preamble signatures which in this example is 7 and N non-dedicated random access preamble signatures. Table 1100 includes columns 1102 and 1104 and rows 1106, 1108, 1110, 1112, 1114, 1116, 1118, 1120, 1122, 1124, and 1126. The first row 1106 includes labels identifying the information contained in the each of the columns, The entry (column 1102, row 1106) indicates that the entries in column 1102 includes wireless base station random access preamble signatures also sometimes referred to an ids. The entries in column 1604 identify the type of usage (col. 1104, row 1106 entry) for which the random access preamble signature identified in the same row has been reserved. Row 1108 includes information for the dedicated random access preamble signature 1 (col. 1102, row 1108 entry) that indicates that this RA preamble signature is reserved or available for assignment to a CPE device (col. 1104, row 1108 entry). Row 1110 includes information for the dedicated random access preamble signature 2 (col. 1102, row 1110 entry) that indicates that this RA preamble signature is reserved or available for assignment to a CPE device (col. 1104, row 1110 entry). Row 1112 includes information for the dedicated random access preamble signature 3 (col. 1102, row 1112 entry) that indicates that this RA preamble signature is reserved or available for assignment to a CPE device (col. 1104, row 1112 entry). Row 1114 includes information for the dedicated random access preamble signature 4 (col. 1102, row 1114 entry) that indicates that this RA preamble signature is reserved or available for assignment to a CPE device (col. 1104, row 1114 entry). Row 1116 includes information for the dedicated random access preamble signature 5 (col. 1102, row 1116 entry) that indicates that this RA preamble signature is reserved or available for assignment to a CPE device (col. 1104, row 1116 entry). Row 1118 includes information for the dedicated random access preamble signature 6 (col. 1102, row 1118 entry) that indicates that this RA preamble signature is reserved or available for handoff or handover procedures, e.g., where a CBRS mobile UE is handoff from a first wireless base station to a second wireless base (col. 1104, row 1118 entry). Row 1120 includes information for the dedicated random access preamble signature 7 (col. 1102, row 1120 entry) that indicates that this RA preamble signature is reserved or available for handoff or handover procedures (col. 1104, row 1120 entry). Row 1122 includes information for the non-dedicated random access preamble signature 1 (col. 1102, row 1122 entry) that indicates that this non-dedicated RA preamble signature is not reserved and is available for use by CPE devices and/or UE devices (col. 1104, row 1122 entry) for example use during initial attachment or connection by a CPE device or a UE device. Row 1124, column 1102 entry includes . . . which represents a plurality of non-dedicated random access preamble signatures that are not reserved and are available for use by a CPE device or a UE device (col. 1104, row 1124 entry). Row 1126, column 1102 includes non-dedicated random access preamble N where N is a positive integer greater than 1 which is not reserved but is available for use by CPE devices and/or UE devices. In this example, the wireless base station, e.g., wireless base station 102 of system 100 shown in FIG. 1, supports both CPE devices and mobile CBRS UE devices and therefore the set of random access preamble signatures available for use at the wireless base station has been divided up to support the CPE devices and CBRS UE devices. The set of random access preambles includes a sub-set of dedicated random access preambles (dedicated random access preamble signatures 1 to 7) and a sub-set of non-dedicated random access preambles (non-dedicated random access preamble signatures 1, . . . , N. The set of non-dedicated random access preamble signatures are available for use by CPE devices and UE devices. The sub-set of dedicated random access preamble signatures includes a set of dedicated random access preamble signatures that are available for assignment to CPE devices (dedicated random access preamble signatures 1 to 5 and a set of dedicated random access preamble signatures that are available for use for handoff or handover procedures for mobile UE devices (e.g., CBRS UE B1 103, . . . , CBRS UE BZ 105). The wireless base station may, and in some embodiments does, make the determination of how many dedicated random access preamble signatures to make available for CPE devices and how many dedicated random access preamble signatures to make available for mobile UE based on one or more of the following: number of CPE devices located in the wireless base stations cell or coverage area, average number of mobile UE devices which are involved in a handoff from another base station within a pre-determined time period, and number of mobile UE devices determined to be within the wireless base station's coverage range but are not attached to the wireless base station, e.g., the mobile UE is attached to a different wireless base station whose coverage area overlaps with the wireless base station's coverage area.

FIG. 12 illustrates an exemplary table 1200 including an exemplary set of CPE device priority profile records. The CPE device priority profile records include information about CPE devices within the wireless base station coverage area. Though not shown in table 1200 in some embodiments, the CPE device profile also includes the power transmission level at which the CPE device was instructed to transmit the dedicated random access preamble signature signal to the wireless base station as well as other information about the CPE device such as its.

Table 1200 includes columns 1202, 1204, 1206, 1208, 1210, 1212, 1214, 1216, 1218, 1220, 1222, and 1224 and rows 1226, 1228, 1230, 1232, 1234, 1236, and 1238. This example is applicable to system 100 wherein there are six CPE devices within the wireless base station 102's coverage, for example when CPE device X=6. The first row 1226 includes labels identifying the information contained in each of the columns. The entries in each of the rows (1228, 1230, 1232, 1234, 1236, 1238) of the table correspond to a single CPE device profile and/or profile record. The entry (column 1202, row 1226) indicates that the entries in column 1202 include CPE Device ID. The entries in column 1204 are priority levels determined or generated for the CPE devices (col. 1204, row 1226 entry). The entries in column 1206 are the random access preamble signatures or IDs (e.g., dedicated random access preamble signatures) assigned to the CPE devices by the wireless base station (RA ID label col. 1206, row 1226 entry). The entries in column 1208 are the amount of time the CPE devices were connected to the wireless base station during a first time period (Connect time label col. 1208, row 1226 entry). The entries in column 1210 are the amount of downlink traffic communicated from the wireless base station to the CPE devices during a first time period (DL TRAF label col. 1210, row 1226 entry). The entries in column 1212 are the amount of uplink traffic communicated from the CPE devices to the wireless base station during a first time period (UL TRAF label col. 1212, row 1226 entry). The entries in column 1214 are the number of emergency calls received by the wireless base station from the CPE devices during a first time period (NUMBER E-CALLS label col. 1214, row 1226 entry). The entries in column 1216 represent location information with respect to the CPE devices (Location label col. 1216, row 1226 entry). The entries in column 1218 are the actual and/or estimated number of user equipment devices being serviced by the CPE devices during the first time period (Number of UEs label col. 1218, row 1226 entry). In some embodiments, the number of UEs being serviced by the CPE devices is provided to the wireless base station by the CPE device. In some embodiments, the number of UEs being serviced by a CPE device is estimated based on one or more factors including for example amount of downlink and/or uplink traffic. The entries in column 1220 are the number of random access preamble signals, e.g., non-dedicated random access preamble signals, received by the wireless base station from the CPE devices during the first time period (Number of RA-Preambles label col. 1220, row 1226 entry). The entries in column 1222 are hardware type, version, and/or release of the CPE devices (HW type label col. 1222, row 1226 entry). The entries in column 1224 are software type, version, and/or release of the CPE devices (SW type label col. 1224, row 1226 entry). The priority level for a CPE device is typically determined or generated from one or more attributes, characteristics and/or properties of the CPE device such as for example those included in columns 1208, 1210, 1214, 1218, 1220, 1222, and 1224 which is obtained during a pre-determined time period when the CPE device profiles are being generated. In an exemplary embodiment, the CPE device priority level is determined or generated using the following formula:

CPE device priority score=K1*(Connect time)+K2*(DL TRAF)+K3*(UL TRAF)+K4*(Number E-Calls)+K5*(Location)+K6*(Number UEs)+K7*(Number RA-Preambles)+K8*(HW Type)+K9*(SW Type), where K1, K2, K3, K4, K5, K6, K7, K8 and K9 are weighting factors that can be adjusted to take into account the important of each of the items in the particular instance.

For example, in some instances the location, hardware type (HW type), software type (SW type) are not important and in such cases K8 and K9 are set to zero so they have no affect on the CPE device priority number generated or determined for the CPE device. Similarly the K values may be adjusted to a higher value if an item is more important such as Number of emergency calls (Number E-calls) is adjusted to a higher value than connection time (connect time) putting more weight on importance of the number of emergency calls being received from a CPE device.

The CPE device priority level is based on the CPE device priority score. In some embodiments, the CPE device priority level is set to the determined or generated CPE device priority score. In such cases, the CPE device priority level is a ranking of the CPE devices with as many CPE device priority levels as there are different CPE device priority scores generated or determined. In some other cases, the number of CPE device priority levels is fixed and the number of CPE devices within one or more CPE device priority levels is also fixed. For example, the number of CPE devices in the highest priority level may be set or determined based on the speed and/or computation power of the wireless base station to process and respond to incoming CPE device random access preamble requests within a period of time or time window. Whereas the lowest CPE device priority level does not have a limit but includes all CPE devices not in a higher CPE device priority level.

In another embodiments, the number of CPE devices may be, and sometimes are, divided up so that a 1st percentage of CPE devices are placed in a first CPE device priority level based on their CPE device priority number, a 2nd percentage of CPE devices are placed in a second CPE device priority level based on their CPE device priority, . . . , and a Nth percentage of CPE devices are placed in a Nth device priority level based on their CPE device priority level, where N is an integer greater than 2. For example, the 25% of the CPE devices having the lowest CPE device priority scores may be, and in some embodiments are, included in the 1st CPE device priority level which in this example is the lowest CPE device priority level. Of the remaining CPE devices, the 50% with the lowest CPE device priority scores may be placed in the 2nd CPE device priority level. The remaining 25% of CPE devices which are the CPE devices with the highest priority scores are then placed in the 3rd CPE device priority level which is the highest device priority level.

In the example shown in table 1200 for the sake of simplifying the example the connection time, amount of downlink traffic, amount of uplink traffic, number of emergency calls, location, number of user equipment devices, number of random access preamble signals received, hardware type and software type are numerical values which have been normalized to be on a common scale of 1 to 10. In some embodiments, the actual values as well as the normalized values are included in the CPE device profile. Furthermore, the CPE device priority level have been determined based on the equation CPE device priority score=K1*(Connect time)+K2*(DL TRAF)+K3*(UL TRAF)+K4*(Number E-Calls)+K5*(Location)+K6*(Number UEs)+K7*(Number RA-Preambles)+K8*(HW Type)+K9*(SW Type) where K1=0.5, K2=1, K3=0.5, K4=1, K5=0.1, K6=1, K7=0.2, K8=0.1, and K9=0.1. Furthermore, the CPE device priority levels have based on grouping the CPE devices into three CPE device priority levels, CPE device priority level 1 (lowest priority), CPE device priority level 2 (second lowest priority) and CPE device priority level 3 (highest priority level) based on the generated and/or determined CPE device scores. The CPE device priority levels include 2 CPE devices in the highest priority level, 1 CPE device in the 2nd highest level and 3 CPE devices in the lowest priority level.

In this example, the weighting shows most important factors are the downlink traffic, the number of emergency calls received from the CPE device, and the number of UEs being serviced by the CPE device whereas the CPE device's hardware type and Software type are the least important factors. In another example the SW type may be weighted the highest such as following a software upgrade which has been distributed to a plurality of CPE devices requiring there re-boot and reconnection to the wireless base station.

The CPE profile information in row 1228 of table 1200 indicates that CPE device 1 (column 1202, row 1228) has: a priority level of 3 (highest priority level) (entry column 1204, row 1228), an assigned dedicated random access preamble signature 1 (entry column 1206, row 1228), a determined normalized connection time of 4 (entry column 1208, row 1228), a determined normalized downlink traffic amount of 7 (entry column 1210, row 1228), a determined normalized uplink traffic amount of 1 (entry column 1212, row 1228), a determined normalized number of emergency calls 5 (entry column 1214, row 1228), a determined normalized location of 1 (entry column 1216, row 1228), a determined normalized number of UEs of 5 (entry column 1218, row 1228), a determined normalized number of received random access preambles of 2 (entry column 1220, row 1228), a determined normalized hardware type of 1 (entry column 1222, row 1228); and a determined normalized software type of 1 (entry column 1224, row 1228). Row 1230 includes the CPE device profile information for CPE Device 2. Row 1232 includes the CPE device profile information for CPE Device 3. Row 1234 includes the CPE device profile information for CPE Device 4. Row 1236 includes the CPE device profile information for CPE Device 5. Row 1238 includes the CPE device profile information for CPE Device 6. CPE Device 2 and CPE Device 6 have both been assigned the same dedicated random access preamble signature 2. This is so because in this example the wireless base station only has five dedicated random access preamble signatures available for assignment to CPE devices as shown in table 1100 of FIG. 11. The wireless base station determined to assign the same dedicated random access preamble signature both the CPE device 2 and CPE device 6 based on the CPE device 2 and CPE device 6 having the lowest number of random access preambles signals received at the wireless base station from these two devices and these two devices being in the lowest priority level. This assignment allows for the best probability that the two CPE devices will not interfere with one another as they are the two devices with lowest number of transmissions of the random access preamble signals to the wireless base station. In some embodiments, the determination of which CPE devices are to be assigned the same dedicated random access priority level also or alternatively based on the location of the CPE devices to one another. In some embodiments, the CPE device 2 and CPE device 6 will be instructed to transmit the dedicated random access preamble signatures at different power levels.

FIG. 13 illustrates an exemplary table 1300 of CPE device random access preamble signature assignments, e.g., dedicated random access preamble signature assignments and priority level for a wireless base station. In this example, the information in table 1300 includes for each CPE device to which a random access preamble signature has been assigned, the CPE device Identifier (ID), the determined priority level for the CPE device, and the random access preamble signature assigned to the CPE device. The information included in exemplary table 1300 is a sub-set of the information included in the CPE device profile table 1200. In some embodiments, the random access preamble signature assignments and CPE device priority level are not included in the CPE device profile but are stored in a separate record as shown in exemplary table 1300. In some embodiments, the exemplary table 1300 serves as the access priority list for the wireless base station wherein a received random access preamble signature's priority level is obtained based on a look up in the records of table 1300.

The first row 1308 of table 1300 includes labels identifying the CPE device information contained in the each of the columns. The entry column 1302, row 1308 indicates that the entries in column 1302 includes the CPE device ID. The entries in column 1304 identify the CPE device priority level (col. 1304, row 1308 entry). The entries in column 1306 indicate the assigned random access preamble signature for the CPE device. Row 1310 includes information for the CPE device 1 (column 1302, row 1310) which has CPE device priority level 3 (highest priority level) (col. 1304, row 1310) and an assigned dedicated random access preamble signature 1 (col. 1306, row 1310). Row 1312 includes information for the CPE device 2 (column 1302, row 1312) which has CPE device priority level 1 (lowest priority level) (col. 1304, row 1312) and an assigned dedicated random access preamble signature 2 (col. 1306, row 1312). Row 1314 includes information for the CPE device 3 (column 1302, row 1314) which has CPE device priority level 1 (lowest priority level) (col. 1304, row 1314) and an assigned dedicated random access preamble signature 3 (col. 1306, row 1314). Row 1316 includes information for the CPE device 4 (column 1302, row 1316) which has CPE device priority level 3 (highest priority level) (col. 1304, row 1316) and an assigned dedicated random access preamble signature 4 (col. 1306, row 1316). Row 1318 includes information for the CPE device 5 (column 1302, row 1318) which has CPE device priority level 2 (second highest priority level) (col. 1304, row 1318) and an assigned dedicated random access preamble signature 5 (col. 1306, row 1318). Row 1320 includes information for the CPE device 6 (column 1302, row 1320) which has CPE device priority level 1 (lowest priority level) (col. 1304, row 1320) and an assigned dedicated random access preamble signature 2 (col. 1306, row 1320).

FIG. 14 illustrates an exemplary table 1100' identifying a set of random access preamble signatures available for use at a wireless base station with corresponding information regarding type of usage. Table 1100' is similar to table 1100 shown in FIG. 11 however in this example there are no dedicated random access preamble signatures that are available for handoff or handover operations. In this example, the wireless base station 102, e.g., CBSD 1, only provides services to CPE devices which are at fixed locations. The wireless base station does not provide services to UE devices and therefore does not need to reserve any dedicated random access preamble signatures for handoff or handover operations of UE devices. Similarly as only CPE devices are provided service by the wireless base station, the non-dedicated random access preambles are used by the CPE devices, e.g., during initial attachment or connection or until such time as the wireless base station assigns the CPE device a dedicated random access preamble signature for use. Information in rows 1118' and 1120' show that dedicated random access preamble signatures 6 and 7 are available for assignment to CPE devices as discussed above. Information in rows 1122', 1124', and 1126' show that non-dedicated random access preamble signatures are available for use by CPE devices.

Table 1200' shown in FIG. 15 illustrates an exemplary table of CPE device profiles. Table 1200' is the same as table 1200 shown in FIG. 15 with the exception that CPE device 6 has now been assigned dedicated random access preamble signature 6 (entry column 1206', row 1238'). In this example, the wireless base station has 7 dedicated random access preamble signatures available as shown in table 1100' of FIG. 11 and therefore each of the six CPE devices is assigned a unique random access preamble signature.

Figure 16:
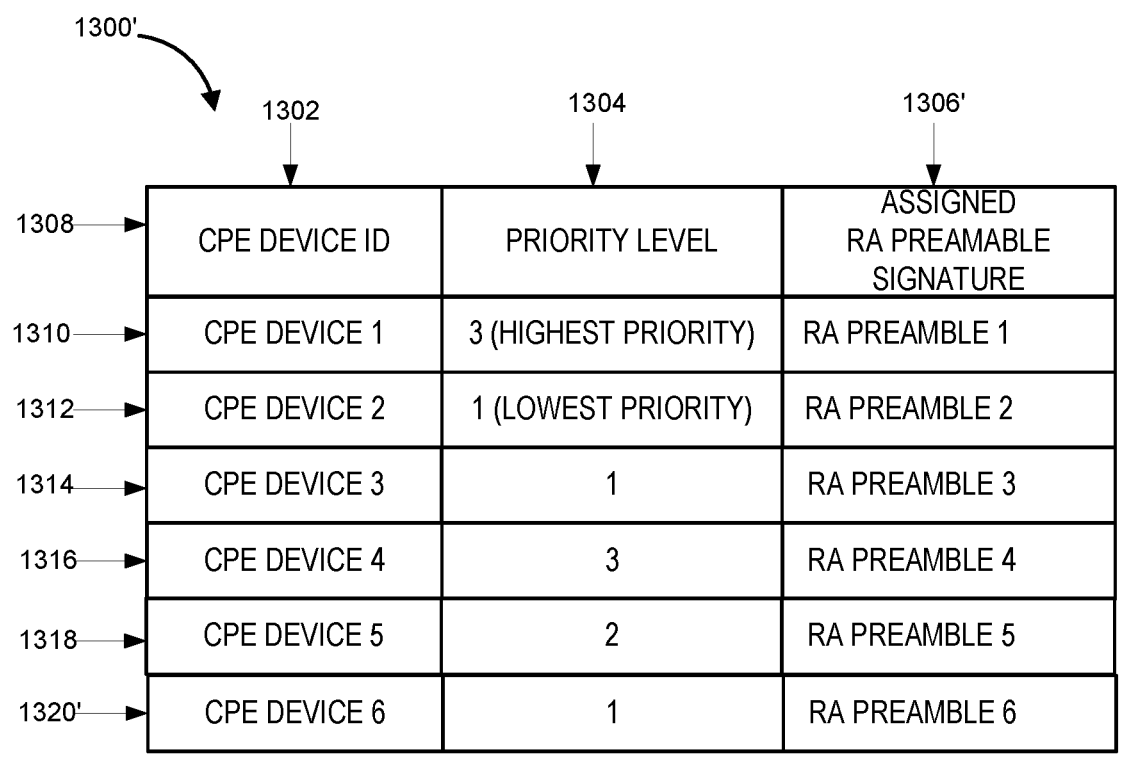
FIG. 16 illustrates an exemplary table of CPE device random access preamble signature assignments and priority level generated and/or used by a wireless base station.

Table 1300' shown in FIG. 16 illustrates an exemplary table of CPE device random access preamble signature assignments and priority level for a wireless base station with the CPE device profiles shown in table 1200' of FIG. 15. Table 1300' is the same as table 1300 with the exception that CPE device 6 has been assigned dedicated random access preamble signature 6 (entry column 1306', row 1320').

Figure 17:
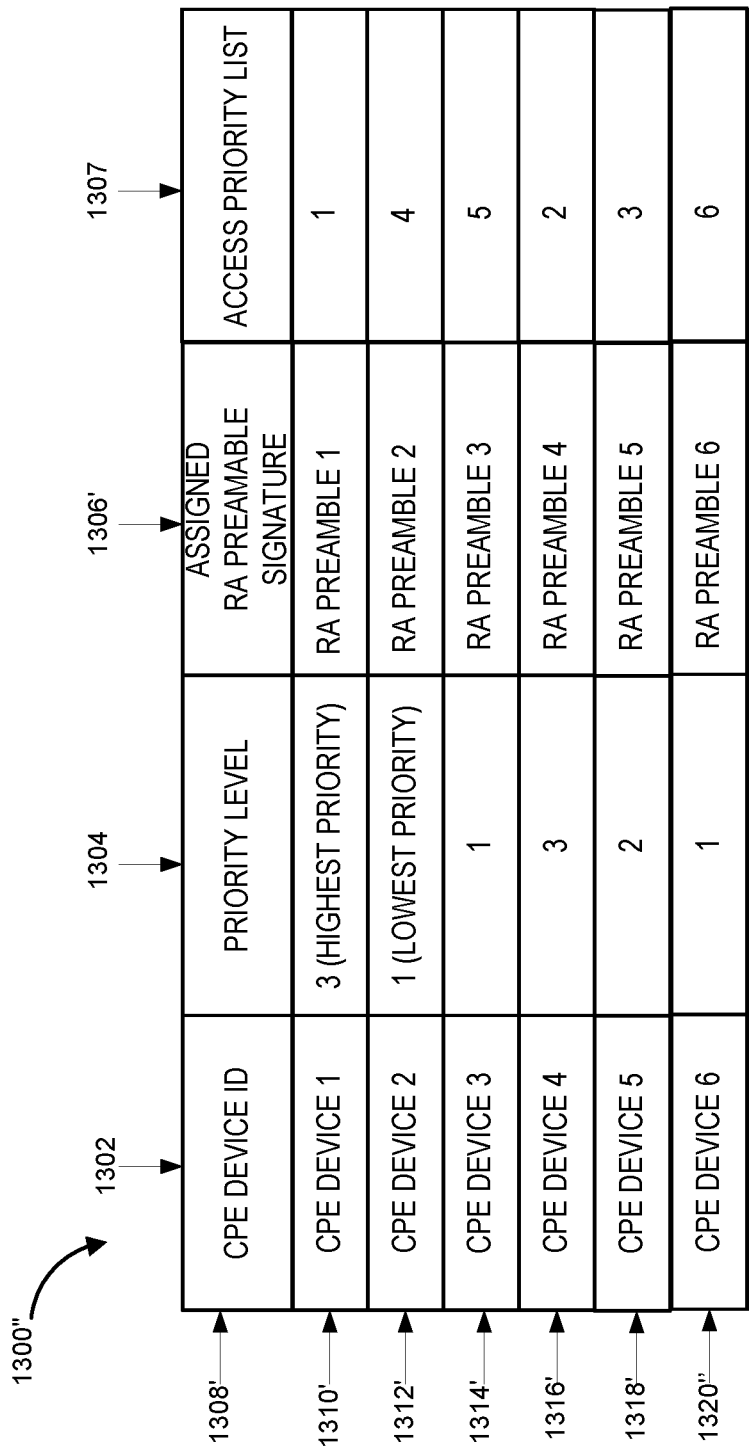
FIG. 17 illustrates an exemplary table of CPE device random access preamble signature assignments, CPE device priority levels and access priority list for a wireless base station.

Exemplary table 1300" shown in FIG. 17 includes and exemplary access priority list shown in column 1307 which has been added to the table 1300'. The information contains in rows 1308', 1310', 1312', 1314', 1316', 1318', and 1320" are the same as in rows 1310, 1312, 1314, 1316, 1318 and 1320' with the exception of the information included in column 1307. The entry column 1307, row 1308 indicates that column 1307 includes access priority list information. The entries in column 1307 indicate that in this example the access priority is CPE device 1, CPE device 4, CPE device 5, CPE device 2, CPE device 3 and CPE device 6. If the random access preamble signatures are all received concurrently or within a predetermined time period or window, the wireless base station will respond the received random access preamble signatures in the order of is CPE device 1 (priority access list entry 1 (entry column 1307, row 1310')), CPE device 4 (priority access list entry 2 (entry column 1307, row 1316')), CPE device 5 (priority access list entry 3 (entry column 1307, row 1318')), CPE device 2 (priority access list entry 4 (entry column 1308, row 1312')), CPE device 3 (priority access list entry 5 (entry column 1307, row 1314)) and CPE device 6 (priority access list entry 6 (entry column 1307, row 1320")).

In some embodiments, the information in the tables 1100, 1200, 1300, 1100', 1200', 1300' and 1300" are stored in the memory of the wireless base station, e.g., non-volatile memory so that the information is not lost upon a power failure or a reset of the wireless base station.

Various exemplary embodiments illustrating different features of the present invention will now be discussed.

List of Set of Exemplary Numbered Method Embodiments:

Method Embodiment 1. A wireless communications method comprising: receiving over the air at a wireless base station a plurality of random access preamble signals from a plurality of devices; and determining, by the wireless base station, the order in which to respond to the received random access preamble signals based on an access priority list.

Method Embodiment 2. The wireless communications method of method embodiment 1, wherein said plurality of devices includes one or more customer premises equipment devices, each of said one or more customer premises equipment devices providing services to one or more user equipment devices.

Method Embodiment 2A. The wireless communications method of method embodiment 2, wherein said one or more customer premises equipment devices includes a first customer premises equipment device located at a first customer premises which provides services to a first plurality of user equipment devices located at the first customer premises; wherein said first plurality of user equipment devices are Wi-Fi devices; and wherein said first customer premises equipment device includes a first communications interface for communicating with the wireless base station and a second communications interface for communicating with the first plurality of user equipment devices.

Method Embodiment 2A1. The wireless communications method of method embodiment 2A, wherein the first communications interface is a wireless communications interface which operates in accordance with a first wireless protocol.

Method Embodiment 2A2. The wireless communications method of method embodiment 2A1, wherein the second communications interface is coupled or connected to one or more WI-FI access points or Wi-Fi routers through which the first customer premises equipment device communicates with the first plurality of user equipment devices.

Method Embodiment 2A3. The wireless communications method of method embodiment 2A2, wherein the second communications interface is a Wi-Fi communications interface through which the first customer premises equipment device communicates with the first plurality of user equipment devices.

Method Embodiment 2A4. The wireless communications method of method embodiment 2A3 or 2A4 wherein the first wireless protocol is not a Wi-Fi communications protocol.

Method Embodiment 2A5. The wireless communications method of method embodiment 23 or 2A4 wherein the first wireless protocol is one of the following wireless communications protocols: a Citizens Broadband Radio Services protocol, an LTE protocol, a 4G protocol or a 5G protocol.

Method Embodiment 3. The wireless communications method of method embodiment 2, further comprising: generating from information obtained over a first time period, by the wireless base station, a customer premises equipment device profile for each of the one or more customer premises equipment devices connected to the wireless base station, each of said customer premises equipment device profiles including a customer premises equipment device identifier which identifies the customer premises equipment device to which the customer premises equipment device profile corresponds and one or more characteristics, attributes or properties of the customer premises equipment device.

Method Embodiment 3A. The wireless communications method of method embodiment 3, wherein said one or more characteristics, attributes or properties of the customer premises equipment device includes one or more of the following: (i) location of the customer premises equipment device; (ii) customer premises equipment software type (e.g., software version and/or release number such as LTE or 5G release number—higher the release number higher the priority); (iii) customer premises equipment hardware type (e.g., hardware equipment type identification information/identification number, hardware version and/or release number, number of CPUs, number of memory units); (iv) an amount of time during the first time period during which the customer premise equipment device is connected to the wireless base station; (v) an amount of downlink traffic communicated from the wireless base station to the customer premises equipment device; (vi) an amount of uplink traffic communicated from the customer premises equipment device to the wireless base station; (vii) a number of times the wireless base station receives a random access preamble signal from the customer premises equipment device; and (viii) a number of emergency calls received from the customer premises equipment device.

Method Embodiment 4. The wireless communications method of method embodiment 3, further comprising: generating the access priority list based on information included in customer premises equipment profiles.

Method Embodiment 4A. The wireless communications method of method embodiment 3, wherein said generating the access priority list based on information contained in the customer premises equipment profiles includes determining a priority level for each of the plurality of customer premises equipment devices based on at least the amount of time during the first time period during which the customer premise equipment device is connected to the wireless base station; the amount of downlink traffic communicated from the wireless base station to the customer premises equipment device; and/or the number of emergency calls received from the customer premises equipment device.

Method Embodiment 4B. The wireless communications method of method embodiment 4A, wherein said determining a priority level for each of the plurality of customer premises equipment devices based on at least the amount of time during the first time period during which the customer premise equipment device is connected to the wireless base station; the amount of downlink traffic communicated from the wireless base station to the customer premises equipment device; and/or the number of emergency calls received from the customer premises equipment device includes generating a weighted average.

Method Embodiment 5. The wireless communications method of method embodiment 2, wherein said wireless base station includes a set of dedicated random access preamble signatures and a set of non-dedicated random access preamble signatures.

Method Embodiment 5A. The wireless communications method of method embodiment 5, wherein the set of dedicated random access preambles are a set of 64 different preambles which are used for contention free random access procedures (e.g., CBRS CPE devices reconnections, mobile UE handovers between wireless base stations).

Method Embodiment 6. The wireless communications method of method embodiment 5, further comprising: prior to receiving said plurality of random access preamble signals at the wireless base station: determining, by the wireless base station, the number of customer premises equipment devices connected to the wireless base station; determining a priority level for each of customer premises equipment device; and assigning one of the dedicated random access preambles from the set of dedicated random access preambles to the customer premises equipment devices connected to the wireless base station.

Method Embodiment 6A. The wireless communications method of method embodiment 6, further comprising: wherein when the number of customer premise equipment devices is equal to or less than the number of dedicated random access preambles available for assignment by the wireless base station, said assigning one of the dedicated random access preambles from the set of dedicated random access preambles to customer premises equipment devices connected to the wireless base station includes assigning a different dedicated random access preamble to each of the customer premises equipment devices.

Method Embodiment 6B. The wireless communications method of method embodiment 6A, wherein when the number of customer premise equipment devices is greater than the number of dedicated random access preambles available for assignment by the wireless base station, said assigning one of the dedicated random access preambles from the set of dedicated random access preambles to customer premises equipment devices connected to the wireless base station includes: assigning dedicated random access preambles to each of the customer premises equipment devices based on customer premises equipment profile information for the customer premises equipment devices.

Method Embodiment 6B1. The wireless communications method of method embodiment 6B, further comprising: determining, by the wireless base station, a customer premises equipment device profile for each of the customer premises equipment devices connected to the wireless base station; and storing, by the wireless base station, each of the determined customer premises equipment device profiles in a customer premises equipment record in memory of the wireless base station.

Method Embodiment 6B2. The wireless communications method of method embodiment 6B1, wherein said determining, by the wireless base station, a customer premises equipment device profile includes determining for a first time period: (i) location of the customer premises equipment device; (ii) a number of times the wireless base station receives a random access preamble signal from the customer premises equipment device.

Method Embodiment 6B3. The wireless communications method of method embodiment 6B2, further comprising: when assigning the same dedicated random access preamble to more than one customer premises equipment device basing said assignment on (i) the priority level of the customer premises equipment devices, and/or (ii) the number of times the wireless base station receives a random access preamble signal from each of the customer premises equipment devices during a time period (e.g., when the same dedicated preamble needs to be assigned to two CPE devices first chose two CPE devices with the same priority level such as for example the lowest priority level and then chose CPE devices at the lowest priority level from which the wireless base station received least number of random access preamble signals during a time period so as to minimize the probability of a collision/conflict that can occur when both CPE devices are trying to transmit the dedicated preamble to the wireless base station at the same time).

Method Embodiment 6B4. The wireless communications method of method embodiment 6B3, further comprising: when assigning the same dedicated random access preamble to more than one customer premises equipment device basing said assignment on (i) the priority level of the customer equipment devices and/or (ii) the location of the customer premises equipment devices to another (e.g., when the same dedicated preamble needs to be assigned to two CPE devices chose CPE devices with same priority level (e.g., lowest priority level) and which are the furthest distance from one another so as to minimize the amount of interference).

Method Embodiment 7. The wireless communications method of method embodiment 6 further comprising: communicating, by the wireless base station, to each customer premise equipment device connected to the wireless base station information identifying the dedicated random access preamble assigned to the particular customer premises equipment device.

Method Embodiment 7A. The wireless communications method of method embodiment 7 further comprising: communicating to each customer premise equipment device connected to the wireless base station the power level to use when transmitting the dedicated random access preamble signature assigned to the particular customer premises equipment device.

Method Embodiment 7B. The wireless communications method of method embodiment 7A further comprising: communicating to each customer premise equipment device an instruction not to increment the transmission power level used for transmitting the dedicated random access preamble signal after a failure to receive a response to a transmission of the dedicated random access preambles signal.

Method Embodiment 7C. The wireless communications method of method embodiment 7 further comprising: when two customer premises equipment devices have the same priority level instructing the customer premises equipment devices to use different power levels when transmitting dedicated random access preambles to the wireless base station.

Method Embodiment 8. The wireless communications method of method embodiment 4, wherein the received plurality of random access preamble signals are dedicated random access preamble signals previously assigned to customer premises equipment devices; and wherein said determining the order in which to respond to the received random access preamble signals based on the access priority list includes: responding to random access preamble signals assigned to customer premises equipment devices with higher priority level on the access priority list before responding to customer premises equipment devices with a lower priority level on the access priority list.

Method Embodiment 9. The wireless communications method of method embodiment 8, wherein the received plurality of random access preamble signals are received after the wireless connection between the wireless base station and the customer equipment devices is severed.

Method Embodiment 9A. The wireless communications method of method embodiment 9, wherein the wireless connection between the wireless base station and the customer equipment devices is severed because of one of the following: a power outage affecting either the customer equipment devices or the wireless base station, signal interference, a problem with the wireless base station, a problem with the customer premises equipment devices, a software upgrade of the wireless base station, and/or a software upgrade of the customer premises equipment devices.

Method Embodiment 10. The wireless communications method of method embodiment 1, wherein the received random access preamble signals are either dedicated or non-dedicated random access preamble signals, said dedicated random access preamble signals having a higher priority on the access priority list than said non-dedicated random access preamble signals.

Method Embodiment 10A. The wireless communications method of method embodiment 10, further comprising: assigning, by the wireless base station, dedicated random access preambles available to the wireless base station which are not assigned to customer premises equipment devices to mobile user devices during wireless base station handover operations.

Method Embodiment 11. The wireless communications method of method embodiment 1, wherein the plurality of random access preamble signals are received at the wireless base station concurrently.

Method Embodiment 12. The wireless communications method of method embodiment 1, wherein the plurality of random access preamble signals are received during a time window of a first size.

Method Embodiment 13. The wireless communications method of method embodiment 12, wherein the first size is less than an expiration time period after which the plurality of random access preamble signals are considered expired (e.g., an amount of time after which the wireless base station considers the received plurality of random access preamble signals to no longer be valid signals to be responded to).

Method Embodiment 13A. The wireless communications method of method embodiment 12, wherein the first size is less than 20 ms.

Method Embodiment 14. The wireless communications method of method embodiment 1, wherein the random access preambles are physical random access channel preamble signals as defined in ETSI TS 138 321 V15.6.0 (2019-07) 5G; NR; Medium Access Control (MAC) protocol specification (3GPP TS 38.321 version 15.6.0 Release 15).

Method Embodiment 15. The wireless communications method of method embodiment 2, wherein prior to receiving the plurality of random access preamble signals at the wireless base station, utilizing by the one or more customer premises equipment devices non-dedicated random access preamble signals to attach to the wireless base station during a first period of time during which a customer premises equipment device profile is generated for each customer premises equipment device.

Method Embodiment 16. The wireless communications method of method embodiment 15, wherein a priority access list is generated based on said customer premises equipment profiles, said priority access list being a list associating each dedicated random access preamble assigned to a customer premises equipment device and a priority level corresponding to the dedicated random access preamble, said priority level determining the order in which dedicated random access preambles signals received concurrently are processed.

Method Embodiment 16A. The wireless communications method of method embodiment 16, wherein the priority level is a numerical value, said received dedicated random access preambles being responded to in the order of highest numerical value priority level to lowest numerical value priority level when said received dedicated random access preambles are received within a time window of a first size or concurrently.

Method Embodiment 17. The wireless communications method of method embodiment 16, further comprising: assigning different dedicated random access preambles to each of the one or more customer premise equipment devices; communicating information to each of the one or more customer premise equipment device for use in generating the dedicated random access preamble assigned to the particular customer premise equipment device, the transmission power level to use to transmit the particular dedicated random access preamble assigned to the particular customer premise equipment device, and instructions to not increment the transmission power on a re-transmission of the dedicated random access preamble therein minimizing interference introduced to increasing transmission power on re-transmission.

Method Embodiment 18. A wireless communications method comprising: receiving from a wireless base station, at a customer premises equipment device servicing a plurality of user equipment devices, information identifying a dedicated random access preamble to utilize when re-connecting to a wireless base station; and storing in non-volatile memory information identifying the dedicated random access preamble assigned to the customer premises equipment device.

Method Embodiment 19. The wireless communications method of method embodiment 18 further comprising: retrieving from memory the stored information identifying the dedicated random access preamble assigned to the customer premises equipment device after a loss of a wireless connection between the customer premises equipment device and the wireless base station; generating a dedicated random access preamble signal using the retrieved information; and transmitting from the customer premises equipment device the generated dedicated random access preamble signal to the wireless base station.

Method Embodiment 20. The wireless communications method of method embodiment 19 further comprising: receiving from the wireless base station along with the information identifying the dedicated ransom access preamble, the transmission power level to use when transmitting the dedicated random access preamble signal to the wireless base station; storing the received transmission power level in non-volatile memory at the customer premises equipment device; and wherein said generated dedicated random access preamble signal is transmitted at the received transmission power level.

Method Embodiment 21. The wireless communications method of method embodiment 20 further comprising: refraining from increasing the transmission power level when re-transmitting the dedicated random access preamble signal after failing to receive a random access response message from the wireless access base station in response to the transmitted dedicated random access preamble signal.

List of Set of Exemplary Numbered System Embodiments:

System Embodiment 1. A wireless communications system comprising: a wireless base station, said wireless base station including: a memory; and a processor, said processing controlling the wireless base station to perform the following operations: receive over the air at a wireless base station a plurality of random access preamble signals from a plurality of devices; and determine the order in which to respond to the received random access preamble signals based on an access priority list.

System Embodiment 2. The wireless communications system of system embodiment 1, wherein said plurality of devices includes one or more customer premises equipment devices, each of said one or more customer premises equipment devices providing services to one or more user equipment devices.

System Embodiment 2A. The wireless communications system of system embodiment 2, wherein said one or more customer premises equipment devices includes a first customer premises equipment device located at a first customer premises which provides services to a first plurality of user equipment devices located at the first customer premises; wherein said first plurality of user equipment devices are Wi-Fi devices; and wherein said first customer premises equipment device includes a first communications interface for communicating with the wireless base station and a second communications interface for communicating with the first plurality of user equipment devices.

System Embodiment 2A1. The wireless communications system of system embodiment 2A, wherein the first communications interface is a wireless communications interface which operates in accordance with a first wireless protocol.

System Embodiment 2A2. The wireless communications system of system embodiment 2A1, wherein the second communications interface is coupled or connected to one or more WI-FI access points or Wi-Fi routers through which the first customer premises equipment device communicates with the first plurality of user equipment devices.

System Embodiment 2A3. The wireless communications system of system embodiment 2A2, wherein the second communications interface is a Wi-Fi communications interface through which the first customer premises equipment device communicates with the first plurality of user equipment devices.

System Embodiment 2A4. The wireless communications system embodiment of system embodiments 2A3 or 2A4 wherein the first wireless protocol is not a Wi-Fi communications protocol.

System Embodiment 2A5. The wireless communications system of system embodiments 23 or 2A4 wherein the first wireless protocol is one of the following wireless communications protocols: a Citizens Broadband Radio Services protocol, an LTE protocol, a 4G protocol or a 5G protocol.

System Embodiment 3. The wireless communications system of system embodiment 2, wherein said processor further controls the wireless base station to perform the operation of: generating from information obtained over a first time period, by the wireless base station, a customer premises equipment device profile for each of the one or more customer premises equipment devices connected to the wireless base station, each of said customer premises equipment device profiles including a customer premises equipment device identifier which identifies the customer premises equipment device to which the customer premises equipment device profile corresponds and one or more characteristics, attributes or properties of the customer premises equipment device.

System Embodiment 3A. The wireless communications system of system embodiment 3, wherein said one or more characteristics, attributes or properties of the customer premises equipment device includes one or more of the following: (i) location of the customer premises equipment device; (ii) customer premises equipment software type (e.g., software version and/or release number such as LTE or 5G release number—higher the release number higher the priority); (iii) customer premises equipment hardware type (e.g., hardware equipment type identification information/identification number, hardware version and/or release number, number of CPUs, number of memory units); (iv) an amount of time during the first time period during which the customer premise equipment device is connected to the wireless base station; (v) an amount of downlink traffic communicated from the wireless base station to the customer premises equipment device; (vi) an amount of uplink traffic communicated from the customer premises equipment device to the wireless base station; (vii) a number of times the wireless base station receives a random access preamble signal from the customer premises equipment device; and (viii) a number of emergency calls received from the customer premises equipment device.

System Embodiment 4. The wireless communications system of system embodiment 3, wherein said processor further controls the wireless base station to perform the operation of: generating the access priority list based on information included in customer premises equipment profiles.

System Embodiment 4A. The wireless communications system of system embodiment 3, wherein said operation of generating the access priority list based on information contained in the customer premises equipment profiles includes determining a priority level for each of the plurality of customer premises equipment devices based on at least the amount of time during the first time period during which the customer premise equipment device is connected to the wireless base station; the amount of downlink traffic communicated from the wireless base station to the customer premises equipment device; and/or the number of emergency calls received from the customer premises equipment device.

System Embodiment 4B. The wireless communications system of system embodiment 4A, wherein said operation of determining a priority level for each of the plurality of customer premises equipment devices based on at least the amount of time during the first time period during which the customer premise equipment device is connected to the wireless base station; the amount of downlink traffic communicated from the wireless base station to the customer premises equipment device; and/or the number of emergency calls received from the customer premises equipment device includes generating a weighted average.

System Embodiment 5. The wireless communications system of system embodiment 2, wherein said wireless base station includes a set of dedicated random access preamble signatures and a set of non-dedicated random access preamble signatures.

System Embodiment 5A. The wireless communications system of system embodiment 5, wherein the set of dedicated random access preambles are a set of 64 different preambles which are used for contention free random access procedures (e.g., CBRS CPE devices reconnections, mobile UE handovers between wireless base stations).

System Embodiment 6. The wireless communications system of system embodiment 5, wherein said processor further controls the wireless base station to perform the following operations: prior to receiving said plurality of random access preamble signals at the wireless base station: determining, by the wireless base station, the number of customer premises equipment devices connected to the wireless base station; determining a priority level for each of customer premises equipment device; and assigning one of the dedicated random access preambles from the set of dedicated random access preambles to the customer premises equipment devices connected to the wireless base station.

System Embodiment 6A. The wireless communications system of system embodiment 6, wherein when the number of customer premise equipment devices is equal to or less than the number of dedicated random access preambles available for assignment by the wireless base station, said operation of assigning one of the dedicated random access preambles from the set of dedicated random access preambles to customer premises equipment devices connected to the wireless base station includes assigning a different dedicated random access preamble to each of the customer premises equipment devices.

System Embodiment 6B. The wireless communications system of system embodiment 6A, wherein when the number of customer premise equipment devices is greater than the number of dedicated random access preambles available for assignment by the wireless base station, said operation of assigning one of the dedicated random access preambles from the set of dedicated random access preambles to customer premises equipment devices connected to the wireless base station includes: assigning dedicated random access preambles to each of the customer premises equipment devices based on customer premises equipment profile information for the customer premises equipment devices.

System Embodiment 6B1. The wireless communications system of system embodiment 6B, wherein said processor further controls the wireless base station to perform the following operations: determining, by the wireless base station, a customer premises equipment device profile for each of the customer premises equipment devices connected to the wireless base station; and storing, by the wireless base station, each of the determined customer premises equipment device profiles in a customer premises equipment record in memory of the wireless base station.

System Embodiment 6B2. The wireless communications system of system embodiment 6B1, wherein said operation of determining, by the wireless base station, a customer premises equipment device profile includes determining for a first time period: (i) location of the customer premises equipment device; (ii) a number of times the wireless base station receives a random access preamble signal from the customer premises equipment device.

System Embodiment 6B3. The wireless communications system of system embodiment 6B2, further comprising: when assigning the same dedicated random access preamble to more than one customer premises equipment device basing said assignment on (i) the priority level of the customer premises equipment devices, and/or (ii) the number of times the wireless base station receives a random access preamble signal from each of the customer premises equipment devices during a time period (e.g., when the same dedicated preamble needs to be assigned to two CPE devices first chose two CPE devices with the same priority level such as for example the lowest priority level and then chose CPE devices at the lowest priority level from which the wireless base station received least number of random access preamble signals during a time period so as to minimize the probability of a collision/conflict that can occur when both CPE devices are trying to transmit the dedicated preamble to the wireless base station at the same time).

System Embodiment 6B4. The wireless communications system of system embodiment 6B3, further comprising: when assigning the same dedicated random access preamble to more than one customer premises equipment device basing said assignment on (i) the priority level of the customer equipment devices and/or (ii) the location of the customer premises equipment devices to another (e.g., when the same dedicated preamble needs to be assigned to two CPE devices chose CPE devices with same priority level (e.g., lowest priority level) and which are the furthest distance from one another so as to minimize the amount of interference).

System Embodiment 7. The wireless communications system of system embodiment 6, wherein said processor further controls the wireless base station to perform the operation of: communicating, by the wireless base station, to each customer premise equipment device connected to the wireless base station information identifying the dedicated random access preamble assigned to the particular customer premises equipment device.

System Embodiment 7A. The wireless communications system of system embodiment 7, wherein said processor further controls the wireless base station to perform the operation of: communicating to each customer premise equipment device connected to the wireless base station the power level to use when transmitting the dedicated random access preamble signature assigned to the particular customer premises equipment device.

System Embodiment 7B. The wireless communications system of system embodiment 7A, wherein said processor further controls the wireless base station to perform the operation of: communicating to each customer premise equipment device an instruction not to increment the transmission power level used for transmitting the dedicated random access preamble signal after a failure to receive a response to a transmission of the dedicated random access preambles signal.

System Embodiment 7C. The wireless communications system of system embodiment 7 further comprising: when two customer premises equipment devices have the same priority level instructing the customer premises equipment devices to use different power levels when transmitting dedicated random access preambles to the wireless base station.

System Embodiment 8. The wireless communications system of system embodiment 4, wherein the received plurality of random access preamble signals are dedicated random access preamble signals previously assigned to customer premises equipment devices; and wherein said operation of determining the order in which to respond to the received random access preamble signals based on the access priority list includes: responding to random access preamble signals assigned to customer premises equipment devices with higher priority level on the access priority list before responding to customer premises equipment devices with a lower priority level on the access priority list.

System Embodiment 9. The wireless communications system of system embodiment 8, wherein the received plurality of random access preamble signals are received after the wireless connection between the wireless base station and the customer equipment devices is severed.

System Embodiment 9A. The wireless communications system of system embodiment 9, wherein the wireless connection between the wireless base station and the customer equipment devices is severed because of one of the following: a power outage affecting either the customer equipment devices or the wireless base station, signal interference, a problem with the wireless base station, a problem with the customer premises equipment devices, a software upgrade of the wireless base station, and/or a software upgrade of the customer premises equipment devices.

System Embodiment 10. The wireless communications system of system embodiment 1, wherein the received random access preamble signals are either dedicated or non-dedicated random access preamble signals, said dedicated random access preamble signals having a higher priority on the access priority list than said non-dedicated random access preamble signals.

System Embodiment 10A. The wireless communications system of system embodiment 10, wherein said processor further controls the wireless base station to perform the operation of: assigning, by the wireless base station, dedicated random access preambles available to the wireless base station which are not assigned to customer premises equipment devices to mobile user devices during wireless base station handover operations.

System Embodiment 11. The wireless communications system of system embodiment 1, wherein the plurality of random access preamble signals are received at the wireless base station concurrently.

System Embodiment 12. The wireless communications system of system embodiment 1, wherein the plurality of random access preamble signals are received during a time window of a first size.

System Embodiment 13. The wireless communications system of system embodiment 12, wherein the first size is less than an expiration time period after which the plurality of random access preamble signals are considered expired (e.g., an amount of time after which the wireless base station considers the received plurality of random access preamble signals to no longer be valid signals to be responded to).

System Embodiment 13A. The wireless communications system of system embodiment 12, wherein the first size is less than 20 ms.

System Embodiment 14. The wireless communications system of system embodiment 1, wherein the random access preambles are physical random access channel preamble signals as defined in ETSI TS 138 321 V15.6.0 (2019-07) 5G; NR; Medium Access Control (MAC) protocol specification (3GPP TS 38.321 version 15.6.0 Release 15).

System Embodiment 15. The wireless communications system of system embodiment 2, wherein prior to receiving the plurality of random access preamble signals at the wireless base station, utilizing by the one or more customer premises equipment devices non-dedicated random access preamble signals to attach to the wireless base station during a first period of time during which a customer premises equipment device profile is generated for each customer premises equipment device.

System Embodiment 16. The wireless communications system of system embodiment 15, wherein a priority access list is generated based on said customer premises equipment profiles, said priority access list being a list associating each dedicated random access preamble assigned to a customer premises equipment device and a priority level corresponding to the dedicated random access preamble, said priority level determining the order in which dedicated random access preambles signals received concurrently are processed.

System Embodiment 16A. The wireless communications system of system embodiment 16, wherein the priority level is a numerical value, said received dedicated random access preambles being responded to in the order of highest numerical value priority level to lowest numerical value priority level when said received dedicated random access preambles are received within a time window of a first size or concurrently.

System Embodiment 17. The wireless communications system of system embodiment 16, wherein said processor further controls the wireless base station to perform the operation of: assigning different dedicated random access preambles to each of the one or more customer premise equipment devices; communicating information to each of the one or more customer premise equipment device for use in generating the dedicated random access preamble assigned to the particular customer premise equipment device, the transmission power level to use to transmit the particular dedicated random access preamble assigned to the particular customer premise equipment device, and instructions to not increment the transmission power on a re-transmission of the dedicated random access preamble therein minimizing interference introduced to increasing transmission power on re-transmission.

System Embodiment 18. A wireless communications system including a customer premises equipment device comprising: memory; and a processor that controls the customer premises equipment device to perform the following operations: receive from a wireless base station, at a customer premises equipment device servicing a plurality of user equipment devices, information identifying a dedicated random access preamble to utilize when re-connecting to a wireless base station; and store in non-volatile memory information identifying the dedicated random access preamble assigned to the customer premises equipment device.

System Embodiment 19. The wireless communications system of system embodiment 18, wherein said processor further controls the customer premises equipment device to perform the operations of: retrieving from memory the stored information identifying the dedicated random access preamble assigned to the customer premises equipment device after a loss of a wireless connection between the customer premises equipment device and the wireless base station; generating a dedicated random access preamble signal using the retrieved information; and transmitting from the customer premises equipment device the generated dedicated random access preamble signal to the wireless base station.

System Embodiment 20. The wireless communications system of system embodiment 19, wherein said processor further controls the customer premises equipment device to perform the operations of: receiving from the wireless base station along with the information identifying the dedicated ransom access preamble, the transmission power level to use when transmitting the dedicated random access preamble signal to the wireless base station; storing the received transmission power level in non-volatile memory at the customer premises equipment device; and wherein said generated dedicated random access preamble signal is transmitted at the received transmission power level.

System Embodiment 21. The wireless communications system of system embodiment 20, wherein said processor further controls the customer premises equipment device to perform the operation of: refraining from increasing the transmission power level when re-transmitting the dedicated random access preamble signal after failing to receive a random access response message from the wireless access base station in response to the transmitted dedicated random access preamble signal.

List of Set of Exemplary Numbered Non-Transitory Computer Readable Media Embodiments:

Non-transitory Computer Readable Medium Embodiment 1. A non-transitory computer readable medium including a first set of computer executable instructions which when executed by a processor of a wireless base station cause the wireless base station to perform the steps of: receiving over the air at a wireless base station a plurality of random access preamble signals from a plurality of devices; and determining the order in which to respond to the received random access preamble signals based on an access priority list.

Non-transitory Computer Readable Medium Embodiment 2. The non-transitory computer readable medium of non-transitory computer readable medium embodiment 1, wherein said plurality of devices includes one or more customer premises equipment devices, each of said one or more customer premises equipment devices providing services to one or more user equipment devices.

The techniques of various embodiments may be implemented using software, hardware and/or a combination of software and hardware. Various embodiments are directed to apparatus, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements. Various embodiments are also directed to methods, e.g., method of controlling and/or operating wireless base stations, user equipment devices, Wi-Fi Access Points, CPE devices, CBSDs, CBRS tower base stations, CBRS CPE devices, SAS devices, user devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, wireless base stations, user equipment devices, Wi-Fi Access Points, CPE devices, CBSDs, CBRS tower base stations, CBRS CPE devices, SAS devices, user devices, subscriber devices, servers, nodes and/or elements described herein are implemented using one or more components to perform the steps corresponding to one or more methods, for example, ranking, establishing connections, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements are configured to perform the steps of the methods described as being performed by the wireless base stations, user equipment devices, Wi-Fi Access Points, CPE devices, CBSDs, CBRS tower base stations, CBRS CPE devices, SAS devices, user devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements, with a processor which includes a component corresponding to each of the steps of the various described methods performed by the device in which the processor is included. In some but not all embodiments a device, e.g., wireless base stations, user equipment devices, Wi-Fi Access Points, CPE devices, CBSDs, CBRS tower base stations, CBRS CPE devices, SAS devices, user devices, subscriber devices, servers, nodes and/or element, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a wireless base stations, user equipment devices, Wi-Fi Access Points, CPE devices, CBSDs, CBRS tower base stations, CBRS CPE devices, SAS devices, user devices, subscriber devices, servers, nodes and/or element. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, user equipment devices, Wi-Fi Access Points, CPE devices, CBSDs, CBRS tower base stations, CBRS CPE devices, SAS devices, user devices, subscriber devices, servers, nodes and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A wireless communications method comprising:
    generating an access priority list based on information included in wireless device profiles;
    receiving over the air at a wireless base station a plurality of random access preamble signals from a plurality of wireless devices, said plurality of wireless devices including one or more wireless devices providing services to one or more user equipment devices;
    determining, by the wireless base station, the order in which to respond to the received random access preamble signals based on the access priority list; and
    prior to generating the access priority list, generating from information obtained over a first time period, by the wireless base station, a wireless device profile for each wireless device connected to the wireless base station during the first time period, each of said wireless device profiles including a wireless device identifier which identifies the wireless device to which the wireless device profile corresponds and one or more characteristics, attributes or properties of the wireless device.

2. The wireless communications method of claim 1, wherein said one or more characteristics, attributes or properties of the wireless device includes one or more of the following:
    (i) location of the wireless device;
    (ii) wireless device software type;
    (iii) wireless device hardware type;
    (iv) an amount of time during the first time period during which the wireless device is connected to the wireless base station;
    (v) an amount of downlink traffic communicated from the wireless base station to the wireless device;
    (vi) an amount of uplink traffic communicated from the wireless device to the wireless base station;
    (vii) a number of times the wireless base station receives a random access preamble signal from the wireless device; and
    (viii) a number of emergency calls received from the wireless device.

3. The wireless communications method of claim 1, wherein said wireless base station is a Citizens Broadband Radio Service Device.

4. The wireless communications method of claim 1, wherein said wireless base station includes a set of dedicated random access preamble signatures and a set of non-dedicated random access preamble signatures.

5. The wireless communications method of claim 4, further comprising:
    prior to receiving said plurality of random access preamble signals at the wireless base station:
        determining, by the wireless base station, the number of wireless devices connected to the wireless base station;
        determining a priority level for each wireless device connected to the wireless base station; and
        assigning different ones of the dedicated random access preamble signatures from the set of dedicated random access preamble signatures to at least some of the wireless devices connected to the wireless base station based on wireless device profile information.

6. The wireless communications method of claim 5, further comprising:
    communicating, by the wireless base station to wireless devices assigned a dedicated random access preamble signature, information identifying the dedicated random access preamble signature assigned to the wireless device.

7. The wireless communications method of claim 1, wherein the received plurality of random access preamble signals are dedicated random access preamble signals previously assigned to wireless devices; and
    wherein said determining the order in which to respond to the received random access preamble signals based on the access priority list includes: responding to random access preamble signals assigned to wireless devices with higher priority levels on the access priority list before responding to wireless devices with lower priority levels on the access priority list.

8. The wireless communications method of claim 1, wherein the received random access preamble signals are either dedicated or non-dedicated random access preamble signals, said dedicated random access preamble signals having a higher priority on the access priority list than said non-dedicated random access preamble signals.

9. The wireless communications method of claim 1, wherein the plurality of random access preamble signals are received at the wireless base station concurrently.

10. A wireless communications system comprising:
a wireless base station, said wireless base station including:
a memory; and
a processor, said processor controlling the wireless base station to perform the following operations:
generating an access priority list based on information included in wireless device profiles;
receiving over the air at the wireless base station a plurality of random access preamble signals from a plurality of wireless devices, said plurality of wireless devices including one or more wireless devices providing services to one or more user equipment devices;
determining the order in which to respond to the received random access preamble signals based on the access priority list; and
prior to generating the access priority list, generating from information obtained over a first time period a wireless device profile for each wireless device connected to the wireless base station during the first time period, each of said wireless device profiles including a wireless device identifier which identifies the wireless device to which the wireless device profile corresponds and one or more characteristics, attributes or properties of the wireless device.

11. The wireless communications system of claim 10, wherein said one or more characteristics, attributes or properties of the wireless device includes one or more of the following:
(i) location of the wireless device;
(ii) wireless device software type;
(iii) wireless device hardware type;
(iv) an amount of time during the first time period during which the wireless device is connected to the wireless base station;
(v) an amount of downlink traffic communicated from the wireless base station to the wireless device;
(vi) an amount of uplink traffic communicated from the wireless device to the wireless base station;
(vii) a number of times the wireless base station receives a random access preamble signal from the wireless device; and
(viii) a number of emergency calls received from the wireless device.

12. The wireless communications system of claim 10, wherein said wireless base station is a Citizens Broadband Radio Service Device.

13. The wireless communications system of claim 10, wherein said wireless base station includes a set of dedicated random access preamble signatures and a set of non-dedicated random access preamble signatures.

14. The wireless communications system of claim 13, wherein said processor further controls the wireless base station to perform the following operations:
prior to receiving said plurality of random access preamble signals at the wireless base station:
determining, by the wireless base station, the number of wireless devices connected to the wireless base station;
determining a priority level for each wireless device connected to the wireless base station; and
assigning different ones of the dedicated random access preamble signatures from the set of dedicated random access preamble signatures to at least some of the wireless devices connected to the wireless base station based on wireless device profile information.

15. The wireless communications system of claim 10, wherein the received plurality of random access preamble signals are dedicated random access preamble signals previously assigned to wireless devices; and
wherein said determining the order in which to respond to the received random access preamble signals based on the access priority list includes: responding to random access preamble signals assigned to wireless devices with higher priority levels on the access priority list before responding to wireless devices with lower priority levels on the access priority list.

16. The wireless communications system of claim 10, wherein the received random access preamble signals are either dedicated or non-dedicated random access preamble signals, said dedicated random access preamble signals having a higher priority on the access priority list than said non-dedicated random access preamble signals.

17. The wireless communications system of claim 10, wherein the plurality of random access preamble signals are received at the wireless base station concurrently.

18. A non-transitory computer readable medium including a first set of computer executable instructions which when executed by a processor of a wireless base station cause the wireless base station to perform the steps of:
generating an access priority list based on information included in wireless device profiles;
receiving over the air at the wireless base station a plurality of random access preamble signals from a plurality of wireless devices, said plurality of wireless devices including one or more wireless devices providing services to one or more user equipment devices;
determining, by the wireless base station, the order in which to respond to the received random access preamble signals based on the access priority list; and
prior to generating the priority access list, generating from information obtained over a first time period, by the wireless base station, a wireless device profile for each wireless device connected to the wireless base station during the first time period, each of said wireless device profiles including a wireless device identifier which identifies the wireless device to which the wireless device profile corresponds and one or more characteristics, attributes or properties of the wireless device.

19. The non-transitory computer readable medium of claim 18,
wherein said one or more characteristics, attributes or properties of the wireless device includes one or more of the following:
(i) location of the wireless device;
(ii) wireless device software type;
(iii) wireless device hardware type;
(iv) an amount of time during the first time period during which the wireless device is connected to the wireless base station;
(v) an amount of downlink traffic communicated from the wireless base station to the wireless device;
(vi) an amount of uplink traffic communicated from the wireless device to the wireless base station;
(vii) a number of times the wireless base station receives a random access preamble signal from the wireless device; and (viii) a number of emergency calls received from the wireless device.

20. The wireless communications method of claim 1, further comprising: when assigning a dedicated random access preamble to two wireless devices to be used by both wireless devices during a second time period, selecting the two wireless devices based on: (i) a priority level determined for each of the two wireless devices based on information included in the wireless device profiles for the two wireless devices, and (ii) location of the two wireless devices with respect to each other.

* * * * *